United States Patent
Allicock et al.

(10) Patent No.: US 11,708,119 B2
(45) Date of Patent: Jul. 25, 2023

(54) STORABLE CARGO BED SIDEWALLS AND/OR TAILGATE AND METHOD FOR STORING CARGO BED SIDEWALLS AND/OR TAILGATE

(71) Applicant: KUBOTA CORPORATION, Osaka (JP)

(72) Inventors: Nicholas Allicock, Atlanta, GA (US); John White, Atlanta, GA (US)

(73) Assignee: KUBOTA CORPORATION, Osaka (JP)

( * ) Notice: Subject to any disclaimer, the term of this patent is extended or adjusted under 35 U.S.C. 154(b) by 142 days.

(21) Appl. No.: 17/135,145

(22) Filed: Dec. 28, 2020

(65) Prior Publication Data

US 2022/0204097 A1  Jun. 30, 2022

(51) Int. Cl.
*B62D 33/03* (2006.01)
*B62D 33/037* (2006.01)
*B62D 33/033* (2006.01)

(52) U.S. Cl.
CPC .......... *B62D 33/03* (2013.01); *B62D 33/033* (2013.01); *B62D 33/037* (2013.01); *B60Y 2200/20* (2013.01)

(58) Field of Classification Search
CPC .... B62D 33/03; B62D 33/033; B62D 33/037; B60Y 2200/20
USPC .......... 296/26.12, 26.13, 26.14, 26.06, 183.1
See application file for complete search history.

(56) References Cited

U.S. PATENT DOCUMENTS

| | | | | |
|---|---|---|---|---|
| 2,800,358 | A * | 7/1957 | Sherrick, Jr. | B62D 33/03 296/14 |
| 4,171,844 | A * | 10/1979 | Landaal | B62D 33/0273 296/57.1 |
| 4,216,988 | A * | 8/1980 | Weiss | B62D 33/03 296/10 |
| 7,226,100 | B1 * | 6/2007 | Willey | B62D 33/03 296/26.11 |
| 9,242,680 | B2 | 1/2016 | Schwab | |
| 9,896,014 | B2 | 2/2018 | Olli et al. | |
| 10,023,248 | B1 * | 7/2018 | Harlan | B62D 33/0273 |
| 2002/0140245 | A1 * | 10/2002 | Coleman, II | B60R 5/04 296/26.09 |
| 2009/0195007 | A1 * | 8/2009 | Miller | B60P 3/40 296/26.11 |
| 2013/0049395 | A1 * | 2/2013 | Poirier | B60R 5/041 296/37.6 |
| 2013/0094930 | A1 * | 4/2013 | Kalergis | B60P 1/435 296/183.1 |
| 2018/0056842 | A1 * | 3/2018 | Miranda Nieto | B62D 33/0273 |
| 2019/0217903 | A1 * | 7/2019 | Marimon De La Morena | B60J 5/0498 |
| 2021/0171128 | A1 * | 6/2021 | Stojkovic | B60J 5/108 |

FOREIGN PATENT DOCUMENTS

| | | | | |
|---|---|---|---|---|
| KR | 20020040275 A * | 5/2002 | | B62D 33/027 |
| WO | WO-2004089671 A2 * | 10/2004 | | B60P 3/14 |

* cited by examiner

*Primary Examiner* — Dennis H Pedder
*Assistant Examiner* — Kevin P Weldon
(74) *Attorney, Agent, or Firm* — Greenblum & Bernstein, P.L.C.

(57) ABSTRACT

A cargo bed for a utility terrain vehicle (UTV) having a floor, a tailgate, and a pair of sidewalls. The cargo bed is operable to convert from a walled configuration into a wall-stored configuration while at least one of the tailgate and the pair of sidewalls remain mechanically-connected to the floor.

28 Claims, 27 Drawing Sheets

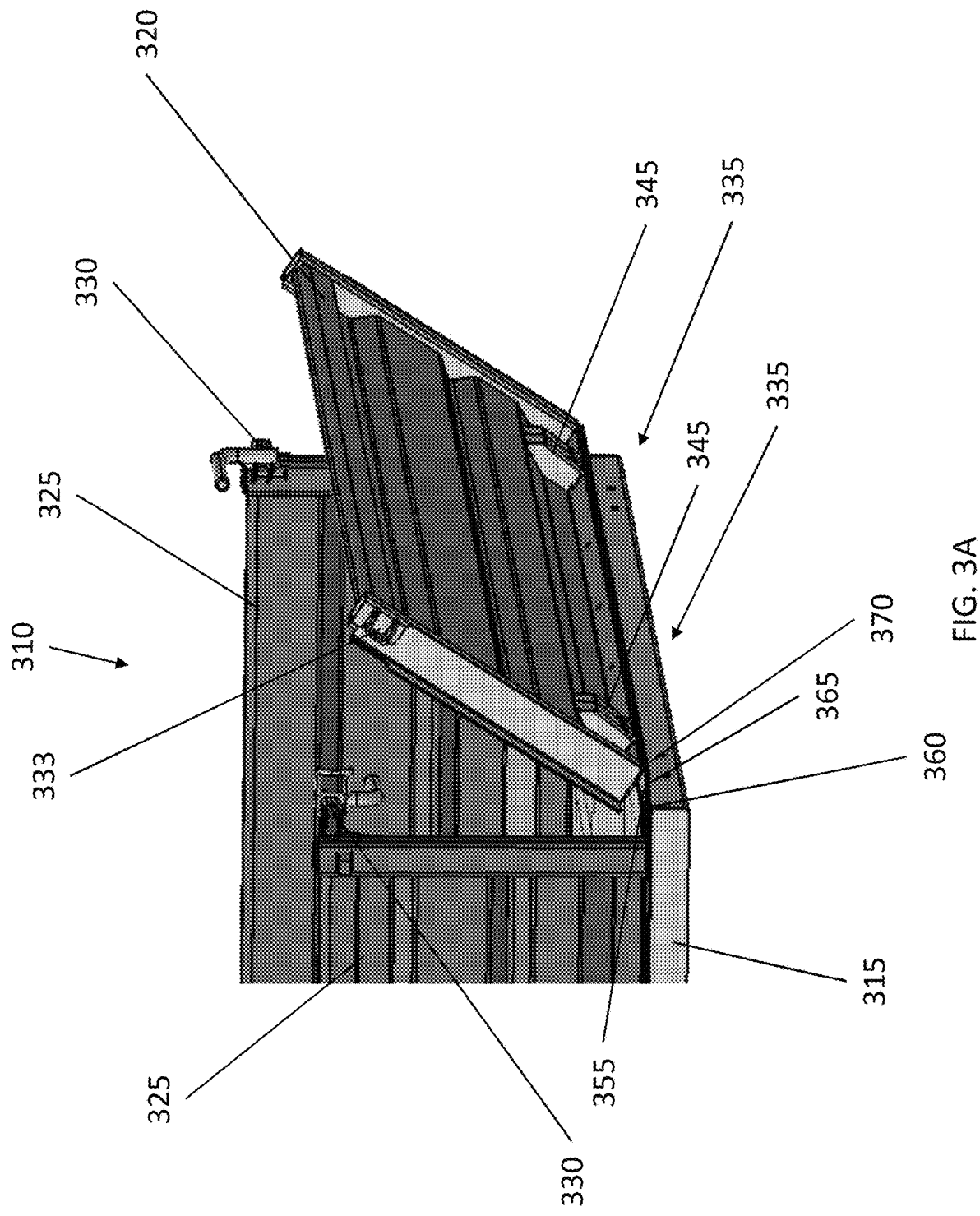

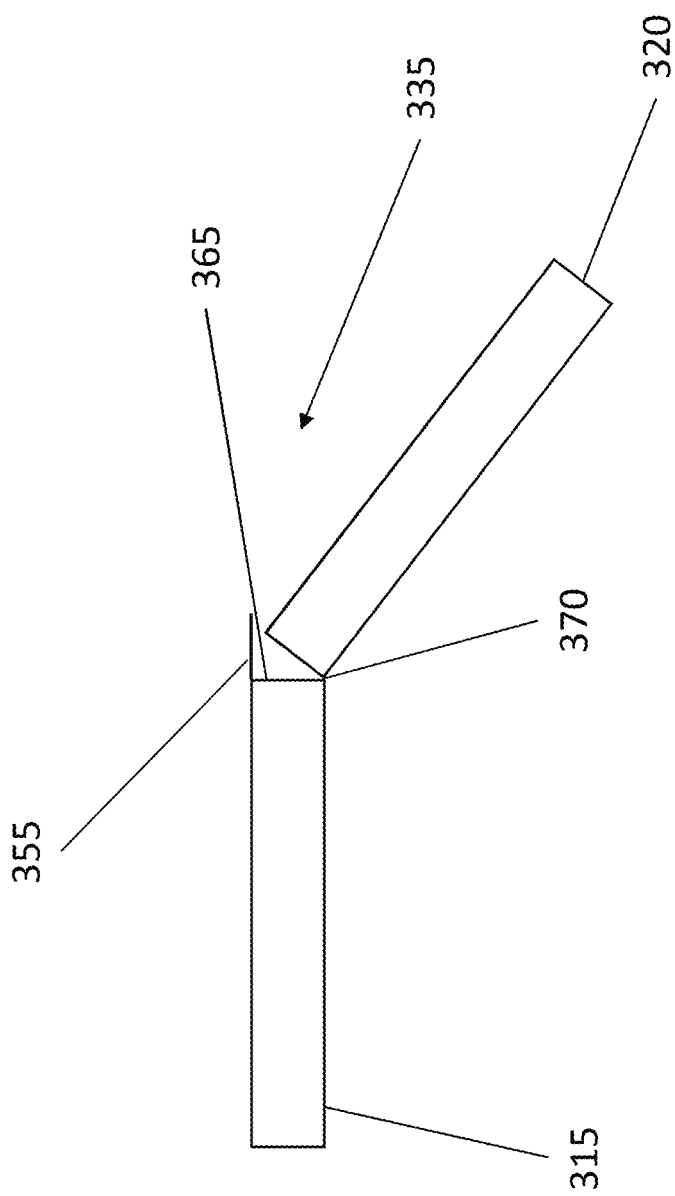

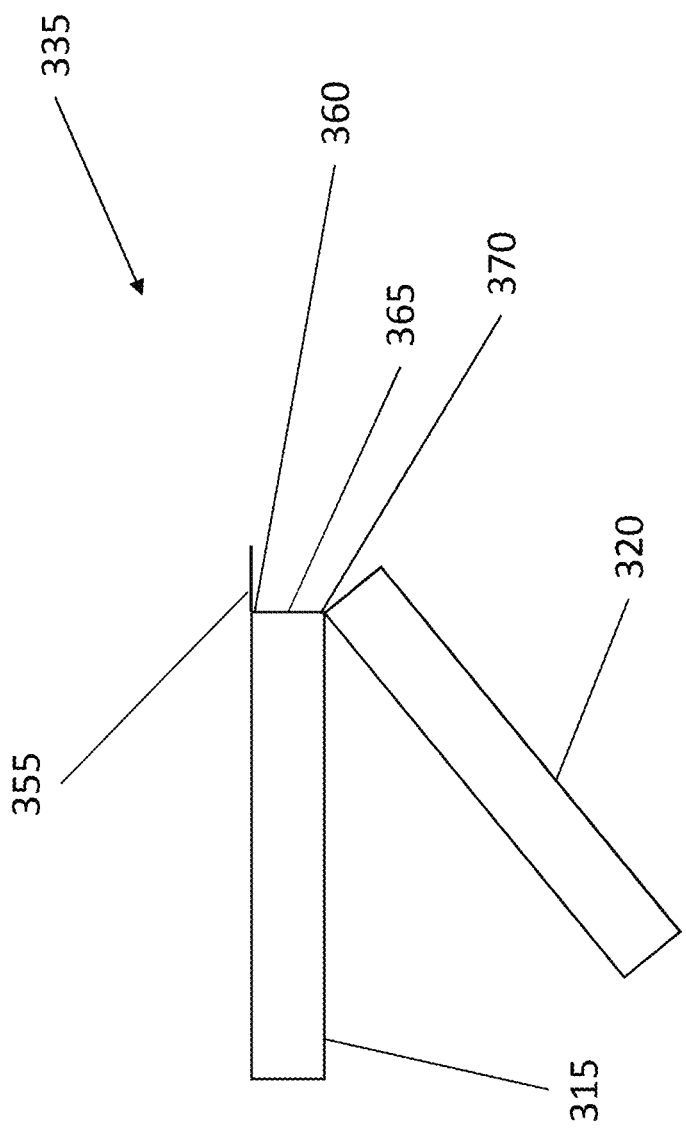

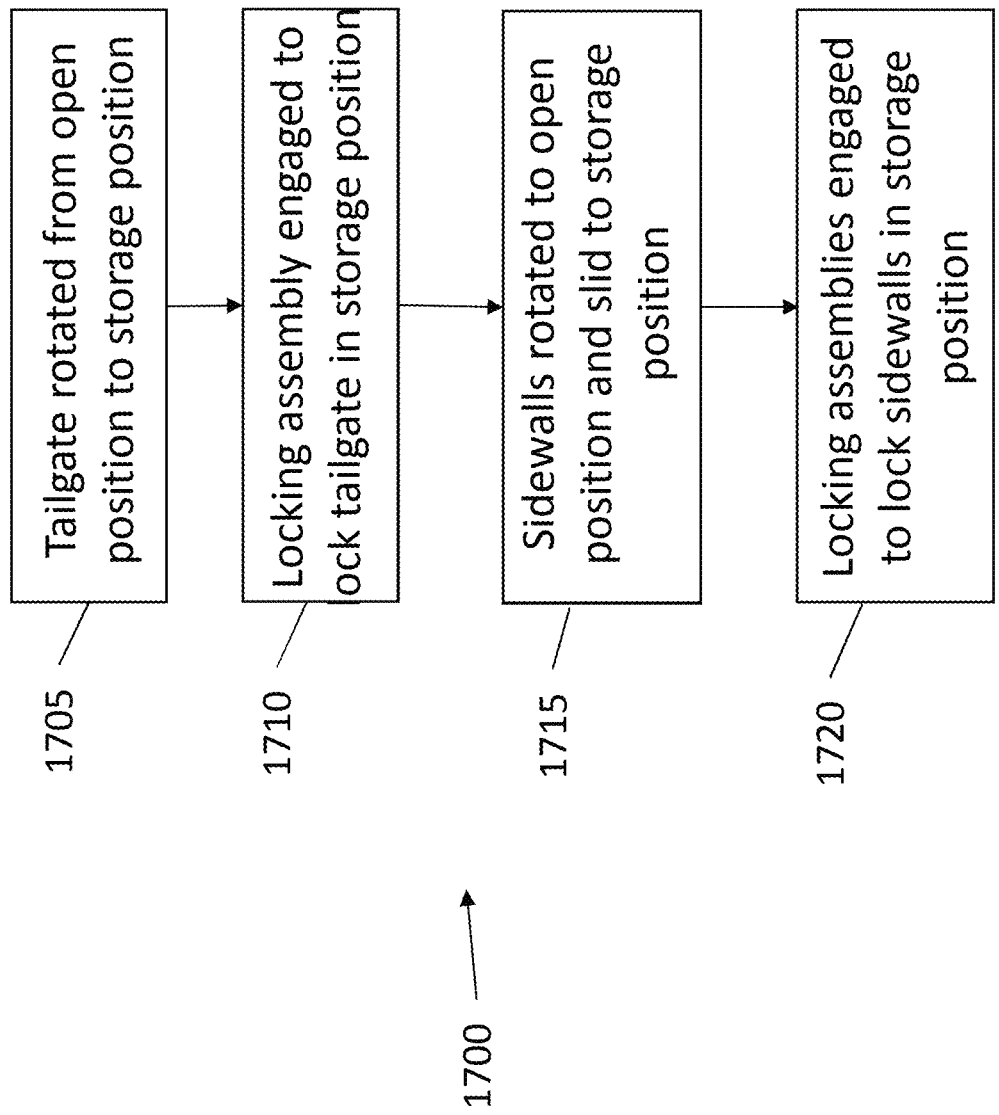

STORABLE CARGO BED SIDEWALLS AND/OR TAILGATE AND METHOD FOR STORING CARGO BED SIDEWALLS AND/OR TAILGATE

BACKGROUND OF THE DISCLOSURE

1. Field of the Disclosure

The present disclosure relates to a utility terrain vehicle (UTV), and more specifically, to storable cargo bed sidewalls and/or tailgate for a utility terrain vehicle, and a method for storing cargo bed sidewalls and/or tailgate.

2. Background of the Disclosure

A utility terrain vehicle (UTV), or side-by-side vehicle (SSV), which is also called a side-by-side off-road multipurpose vehicle or utility task vehicle, is a small, 2- to 6-person, for example, off-road vehicle (e.g., four-wheel drive). UTV's have powertrains similar to those of all-terrain vehicles (ATVs) and have much of (although perhaps not all of) their rugged-terrain capability. Some UTVs have a rear cargo bed, which provides room for a much larger load than most ATVs can haul, without attaching a trailer.

The cargo bed includes a foldable tailgate at a rear end thereof, which tailgate may also be removable from the cargo bed (which may be desirable for some tasks). The cargo bed also includes side walls and a front wall along the perimeter of the cargo bed. Similarly to the tailgate, the side walls are likewise removable from the cargo bed, e.g., to convert to a flatbed (which may also be desirable for some tasks, for example, hauling an object too large to fit within the confines of the walled cargo bed).

With conventional approaches, however, there is no dedicated storage location for the side walls and/or tailgate when removed from the cargo bed. Thus, when the tailgate and/or the side walls (or sides) are removed from the cargo bed, a problem is presented. Namely, when the UTV is being utilized with the tailgate and/or sidewalls not in place, the tailgate and the sidewalls must be stored somewhere. This lack of a dedicated onboard storage location for the side walls and/or gate results in many shortcomings.

For example, if the removed tailgate and/or sidewalls are temporarily arranged in (or on) the cargo bed, this reduces the capacity of the cargo bed to carry actual cargo. Additionally, when "placed" or arranged in the cargo bed, the tailgate and the sidewalls (e.g., which may be unsecured) are susceptible to damage themselves and may cause damage elsewhere (e.g. as the UTV moves).

Alternatively, if these temporarily-removed items are stored elsewhere (i.e., not in the cargo bed) the tailgate and/or the sidewalls require a storage location (e.g. a dedicated storage location), which takes up space. Additionally, when not in place on the UTV, the removed tailgate and/or sidewalls are susceptible to potential damage or misplacement. That is, when the tailgate and/or sidewalls are not in use, these items may be damaged and/or misplaced while in their storage location. Furthermore, once in the storage location, a user must return the UTV to the tailgate and/or sidewalls storage location before being able to utilize the tailgate and/or sidewalls again, which may result in inefficient utilization of the UTV.

Additionally, with conventional UTVs having removable sidewalls and/or gates, it can be physically difficult to remove the tailgate and/or sidewalls (e.g., in order to convert the UTV to a flatbed configuration. That is, the tailgate and/or sidewalls can be quite heavy and may be bulky. As such, their physical handling can be difficult (e.g., for a single person to remove the tailgate and/or sidewalls from the cargo bed, and to move the tailgate and/or sidewalls once removed from the cargo bed).

Thus, there is a need in the art for an improved UTV cargo bed with a dedicated storage location for the side walls and/or gate when removed from the cargo bed (or when the cargo bed is configured or arranged to a flatbed configuration).

SUMMARY OF THE EMBODIMENTS OF THE DISCLOSURE

Aspects of the present disclosure are directed to an improved UTV cargo bed with a dedicated onboard storage location for the side walls and/or tailgate when the cargo bed is configured or arranged to a flatbed configuration. When a user desires to configure the UTV as a flatbed, the user may rearrange the side walls and/or gate from their respective cargo bed orientations into the respective dedicated onboard storage locations of the UTV. In such a manner, the operator (or user) does not have to remove the cargo gates (e.g., sidewalls and/or tailgate) from the UTV in order to convert the cargo bed into, for example, a flatbed configuration.

By implementing aspects of the disclosure, when the tailgate and/or the side walls (or sides) are moved from a walled configuration of the cargo bed (and arranged in a wall-stored configuration in their respective dedicated onboard storage locations), there is no longer a need for the tailgate and the sidewalls to be placed somewhere else. By storing the cargo tailgate and/or sidewalls in a space of the UTV (the respective dedicated onboard storage locations) that is not currently utilized (namely the underside of the floor of the cargo bed), the cargo bed (or a storage box arranged on or in the cargo bed) is not needed to accommodate these removed items. Thus, by implementing aspects of the disclosure, there is no reduction in the capacity of the cargo bed (or flatbed) to carry actual cargo when the tailgate and/or sidewalls are not being utilized. Additionally, when arranged in the respective dedicated onboard storage locations, the tailgate and the sidewalls are not (or are much less) susceptible to damage (e.g., as the UTV moves).

Furthermore, by providing one or more dedicated onboard storage locations, there is no longer a need for a storage location elsewhere (e.g. a dedicated remote storage location) for the removed tailgate and/or the sidewalls, which saves space. Additionally, by implementing aspects of the present disclosure, the removed tailgate and/or sidewalls are not susceptible to misplacement, as they remain attached to the UTV when not in use. As the tailgate and/or sidewalls are always arranged onboard the UTV, the stored tailgate and/or sidewalls are always available for immediate use. That is, by implementing aspects of the disclosure, there is no longer a need for the use to return the UTV to some remote tailgate and/or sidewalls storage location before being able to utilize the tailgate and/or sidewalls again, which results in more efficient utilization of the UTV.

Furthermore, by implementing aspects of the disclosure, it may be less physically difficult to rearrange the tailgate and/or sidewalls, e.g., in order to convert the UTV from a boxed (or walled) configuration to a flatbed (or wall-stored) configuration. As such, an operator can easily switch from a boxed configuration (e.g., with the sidewalls and/or tailgate in an upright orientation) to flatbed configuration (e.g., with the sidewalls and/or tailgate in the onboard dedicated storage location. Moreover, by having the tailgate and/or sidewalls remain with the UTV even when not in use, there is no longer a need to remove or carry the tailgate and/or sidewalls once removed from the cargo bed.

Aspects of the present disclosure are directed to cargo bed for a utility terrain vehicle (UTV). The cargo bed comprises a floor, a tailgate, and a pair of sidewalls, wherein the cargo bed is operable to convert from a walled configuration into a wall-stored configuration while at least one of the pair of sidewalls and the tailgate remains mechanically-connected to the floor.

In embodiments, in the walled configuration, the sidewalls are in an upright position with respect to the floor, and in the wall-stored configuration, the pair of sidewalls remain mechanically-connected to the floor and are positioned in respective sidewall storage positions underneath the floor.

In embodiments, the pair of sidewalls are operable to at least one of pivot or slide into the respective sidewall storage positions underneath the floor.

In certain embodiments, in the wall-stored configuration, the tailgate remains mechanically-connected to the floor and is positioned in a tailgate storage position underneath the floor.

In some embodiments, the tailgate is operable to one of pivot or slide into the tailgate storage position underneath the floor.

In further embodiments, the pair of sidewalls are one of removeably attachable to the floor and pivotably foldable with respect to the floor.

In yet further embodiments, the tailgate is mechanically-detachable from the floor.

In some embodiments, the cargo bed is operable to convert from the walled configuration into the wall-stored configuration while the tailgate and the pair of sidewalls remain mechanically-connected to the floor.

In some embodiments, in the walled configuration, at least the sidewalls are in an upright position with respect to the floor, and in the wall-stored configuration, the tailgate is positioned in a tailgate storage position underneath the floor and the pair of sidewalls are positioned in respective sidewall storage positions underneath the floor.

In additional embodiments, the tailgate storage position is lower than the respective sidewall storage positions such that in the flatbed configuration, the tailgate is beneath the respective sidewalls.

In further embodiments, the tailgate storage position is higher than the respective sidewall storage positions such that in the flatbed configuration, the tailgate is above the respective sidewalls.

In some embodiments, the tailgate is structured to pivot from a closed position, in which the tailgate is arranged approximately perpendicular with respect to the floor, to an open position, in which the tailgate is arranged approximately parallel with respect to the floor, and structured to pivot from the open position to a tailgate storage position, in which the tailgate is arranged approximately parallel with respect to the floor and positioned underneath the floor.

In yet further embodiments, each sidewall is structured to pivot from a sidewall closed position, in which the sidewall is arranged approximately perpendicular with respect to the floor to an open position, in which the sidewall is arranged approximately parallel with respect to the floor, and structured to slide from the open position to a sidewall storage position, in which the sidewall is arranged approximately parallel with respect to the floor and positioned underneath the floor.

In embodiments, the cargo bed further comprises a tailgate locking assembly operable to selectively lock the tailgate in the tailgate storage position.

In additional embodiments, the cargo bed further comprises for each sidewall, a sidewall locking assembly operable to selectively lock each sidewall in the respective sidewall storage positions.

In further embodiments, the cargo bed further comprises a hinge assembly connected between the floor and the tailgate, wherein the hinge assembly is operable to swing the tailgate from a closed position, in which the tailgate is arranged approximately perpendicular with respect to the floor, to a tailgate storage position, in which the tailgate is arranged approximately parallel with respect to the floor and positioned underneath the floor.

In embodiments, the hinge assembly comprises a swing plate pivotably connected via a first pivotable connection to the floor and pivotably connected via a second pivotable connection to the tailgate.

In yet further embodiments, the cargo bed further comprises an extending portion extending from a rear end of the floor, and when the tailgate is in the closed position the extending portion is arranged between the swing plate and the tailgate, such that the swing plate is adjacent a lower surface of the extending portion and the tailgate is adjacent an upper surface of the extending portion.

In embodiments, the cargo bed further comprises for each sidewall a pivot/slide assembly connected between the floor and the sidewall, and the pivot/slide assembly is operable to swing the sidewall from a sidewall closed position, in which the sidewall is arranged approximately perpendicular with respect to the floor, to an open position, in which the sidewall is arranged approximately parallel with respect to the floor, and further operable to slide the sidewall from the open position to a sidewall storage position, in which the sidewall is arranged approximately parallel with respect to the floor and positioned underneath the floor.

In additional embodiments, the pivot/slide assembly comprises at least one swing arm connected to the sidewall, and a respective pivot/slide bearing attached underneath the floor, wherein the at least one swing arm has an end operable to pivot and slide in the pivot/slide bearing.

In further embodiments, each pivot/slide bearing includes a pivot portion arranged at a more outward side of the pivot/slide bearing, and a slide portion extending from the pivot portion to a terminal end of the pivot/slide bearing.

In embodiments, when the tailgate is positioned in the tailgate storage position underneath the floor, an inner side of the tailgate is facing downwardly.

In embodiments, when the pair of sidewalls are positioned in respective sidewall storage positions underneath the floor, respective inner sides of the sidewalls are facing upwardly.

In embodiments, when in the flatbed configuration, the tailgate in the tailgate storage position is structured and arranged to retain the sidewalls positioned in the respective sidewall storage positions, or the sidewalls positioned in the respective sidewall storage positions are structured and arranged to retain the tailgate in the tailgate storage position.

In additional embodiments, the cargo bed is further configured to convert from a walled configuration into an expanded flatbed configuration, in which at least one of the sidewalls is in an open position with the at least one sidewall approximately parallel to the floor.

In further embodiments, cargo bed further comprises a front wall arranged at a front of the floor, a vertical post arranged at each of rear corners of the floor, tailgate supports extending between sides of the tailgate and each of the vertical posts, and for each sidewall, a first sidewall support extending between a rear side of the sidewall and one of the vertical posts and a second sidewall support extending between a front side of the sidewall and the front wall.

Additional aspects of the disclosure are directed to a method of converting a cargo bed having a floor, a tailgate, and a pair of sidewalls from a walled configuration into a flatbed configuration while the tailgate and the pair of sidewalls remain mechanically-connected with the floor. The method comprises at least one of rotating the tailgate from an open position to a tailgate storage position; and rotating each of the sidewalls from an upright position to a sidewall open position and sliding each of the sidewalls from the sidewall open position to respective sidewall storage positions.

Additional aspects of the disclosure are directed to a cargo bed for a utility terrain vehicle (UTV). The cargo bed comprises a floor; a tailgate, and a pair of sidewalls. The tailgate is operable to one of pivot or slide from a tailgate open position into the tailgate storage position underneath the floor while the tailgate remains mechanically-connected with the floor.

BRIEF DESCRIPTION OF THE DRAWINGS

The particulars shown herein are by way of example and for purposes of illustrative discussion of exemplary embodiments of aspects of the present disclosure only and are presented in the cause of providing what is believed to be the most useful and readily understood description of the principles and conceptual aspects of the present disclosure. In this regard, no attempt is made to show structural details in more detail than is necessary for the fundamental understanding of the aspects of the present disclosure, the description taken with the drawings making apparent to those skilled in the art how the forms of the aspects of the present disclosure may be embodied in practice.

Hereafter, embodiments of the present disclosure are described with reference to the drawings. In this detailed description, unless indicated otherwise, a word "front" means the front (forward) side with respect to a vehicle body front/rear direction (traveling direction). A word "rear" means the rear (rearward or reverse) side with respect to the vehicle body front/rear direction (traveling direction). Further, a language "left/right direction" or "lateral direction" means a vehicle body transverse direction (vehicle body width direction) perpendicular to the vehicle body front/rear direction. Also, a word "upper" and a word "lower" respectively refer to positional relationship in the perpendicular direction (vertical direction) of the vehicle body, indicating relationship in terms of ground clearance height.

FIG. 3A shows a view of an exemplary tailgate in an opening position in accordance with aspects of the disclosure;

FIGS. 4A-4H show various schematic views of an exemplary tailgate and hinge assembly as the tailgate is moved between a closed position and a stored position in accordance with aspects of the disclosure;

FIG. 17 depicts an exemplary method for rearranging a sidewall (or tailgate) in accordance with aspects of the disclosure.

DETAILED DESCRIPTION OF THE DISCLOSURE

As used herein, the singular forms "a," "an," and "the" include the plural reference unless the context clearly dictates otherwise. For example, reference to "a magnetic material" would also mean that mixtures of one or more magnetic materials can be present unless specifically excluded. As used herein, the indefinite article "a" indicates one as well as more than one and does not necessarily limit its referent noun to the singular.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100±5, i.e. the range from 95 to 105. Generally, when the terms "about" and "approximately" are used, it can be expected that similar results or effects according to the disclosure can be obtained within a range of ±5% of the indicated value.

As used herein, the term "and/or" indicates that either all or only one of the elements of said group may be present. For example, "A and/or B" shall mean "only A, or only B, or both A and B". In the case of "only A", the term also covers the possibility that B is absent, i.e. "only A, but not B".

The term "substantially parallel" refers to deviating less than 20° from parallel alignment and the term "substantially perpendicular" refers to deviating less than 20° from perpendicular alignment. The term "parallel" refers to deviating less than 5° from mathematically exact parallel alignment. Similarly "perpendicular" refers to deviating less than 5° from mathematically exact perpendicular alignment.

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for example a composition comprising a compound A may include other compounds besides A. However, the term "comprising" also covers the more restrictive meanings of "consisting essentially of" and "consisting of", so that for example "a composition comprising a compound A" may also (essentially) consist of the compound A.

The various embodiments disclosed herein can be used separately and in various combinations unless specifically stated to the contrary.

Figure 1:
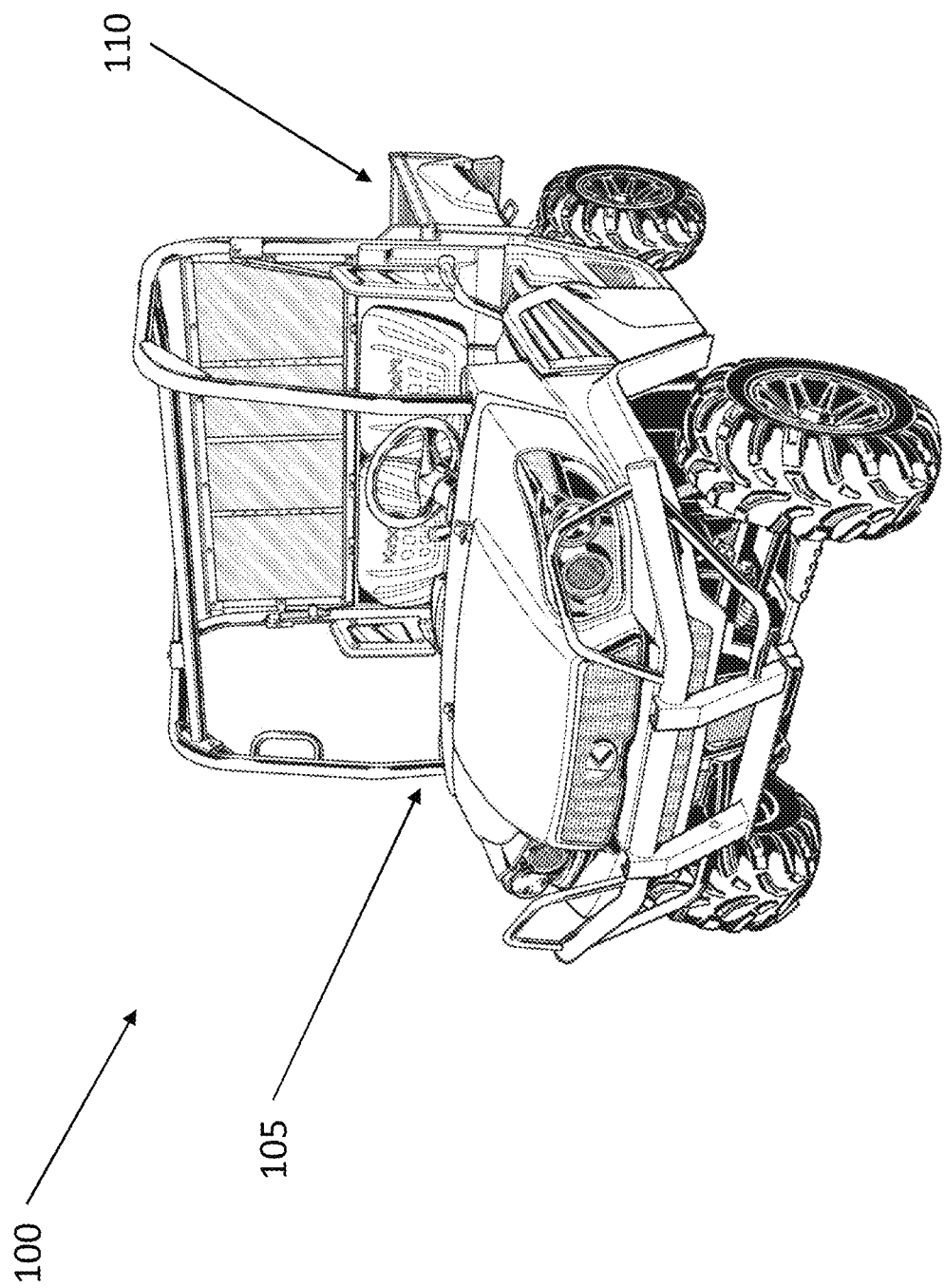
FIG. 1 shows a perspective view of an exemplary utility terrain vehicle (UTV) in accordance with aspects of the disclosure.

FIG. 1 shows a perspective view of an exemplary utility terrain vehicle (UTV) 100 in accordance with aspects of the disclosure. As shown in FIG. 1, the UTV 100 includes a passenger cabin 105 for accommodating the driver (and additional passengers). The UTV 100 also includes a cargo bed 110 for accommodating cargo.

Figure 2:
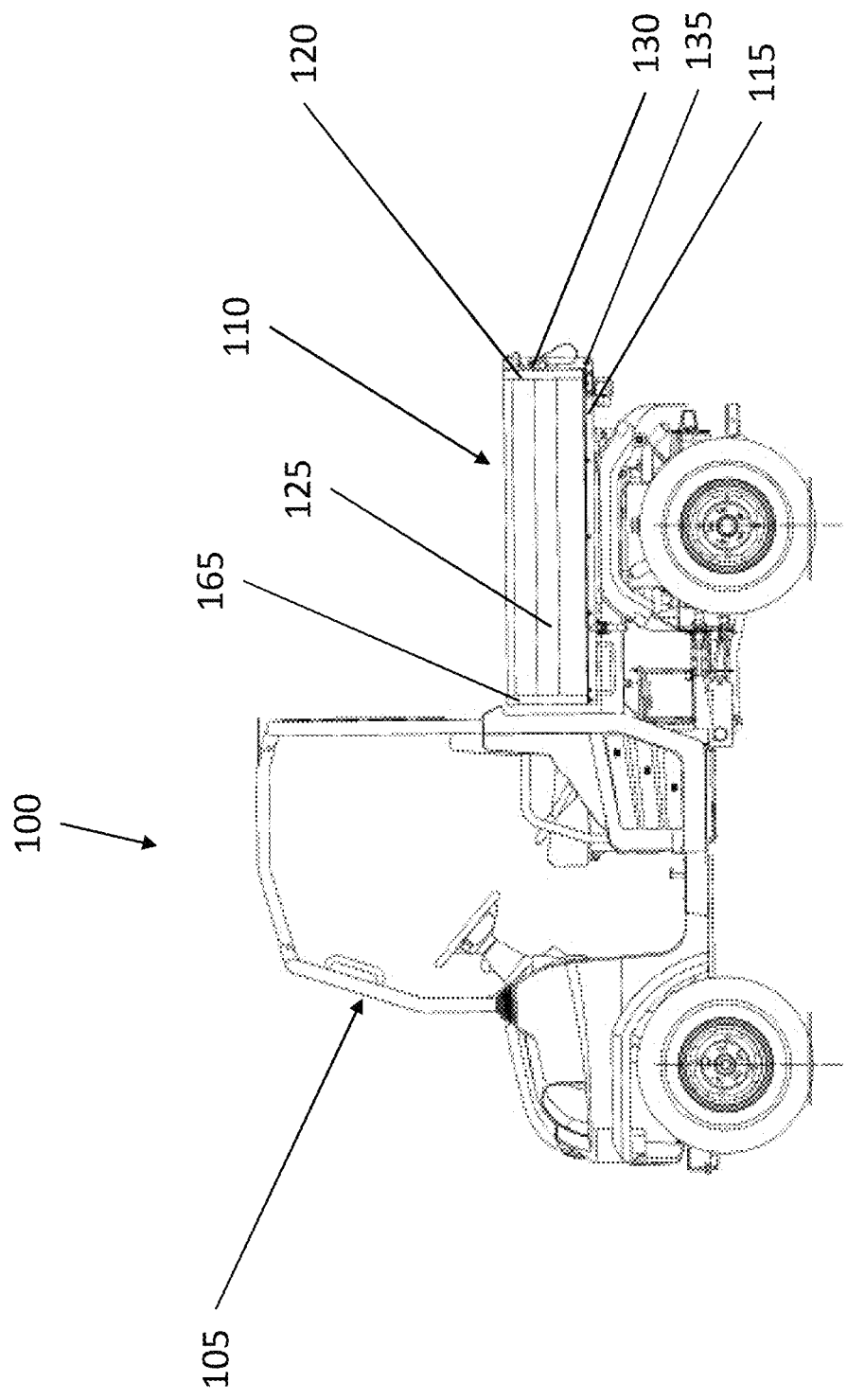
FIG. 2 shows a side view of an exemplary utility terrain vehicle (UTV) in accordance with aspects of the disclosure.

FIG. 2 shows a side view of an exemplary UTV 100 in accordance with aspects of the disclosure. As shown in FIG. 2, the UTV 100 includes a passenger cabin 105 for accommodating the driver (and additional passengers). The UTV 100 also includes a cargo bed 110 for accommodating cargo. As shown in FIG. 2, the cargo bed 110 may include a floor 115, sidewall 125 (only one shown in FIG. 2), a front wall 165, and a tailgate 120. The tailgate 120 is pivotably (or swingably) attached to the floor 115 via a hinge 135. As depicted in FIG. 2, the tailgate 120 is in a closed position. The cargo bed 110 also includes a locking mechanism 135 (e.g., pin and slot) between the side walls 125 and the tailgate 120, so that the tailgate 120 can be locked in the closed position (as shown in FIG. 2).

FIG. 3A shows a view of an exemplary tailgate 320 of a cargo bed 310 in an opening position in accordance with aspects of the disclosure. As shown in FIG. 3A, the tailgate 320 is arranged between an upright (or closed) position and a lowered (or open) position. The cargo bed 310 includes a floor 315, sidewalls 325, a front wall (not shown), and tailgate 320. The cargo bed 310 also includes a locking mechanism 330 (e.g., a pin) on the side walls 325 configured to engage with an engagement 333 (e.g., a slot) on the tailgate 320, so that the tailgate 320 can be locked to the side walls 325 in the closed position. The tailgate 320 is pivotally (or swingably) attached to the floor 315 via a hinge assembly 335.

As shown in FIG. 3A, with an exemplary and non-limiting embodiment, the hinge assembly 335 includes a first pivot connection 360 between the floor 315 and a swing plate 365. The hinge assembly 335 further includes a second pivot connection 370 between the swing plate 365 and the tailgate 320. The hinge assembly may also include support structures 345 arranged on the tailgate 320 to provide additionally stability and/or rigidity to the hinge assembly 335 and tailgate 320.

The floor 315 (or support frame thereof) supports an extending surface 355 that projects rearwardly from an end of the floor 315. When the tailgate 320 is in the closed position (not shown), the tailgate 320 is supported on the extending surface 355. As the tailgate 320 is moved from the closed position to the open position (i.e., wherein the tailgate is approximately parallel to the floor 315), the tailgate 320 rotates around the second pivot connection 370 (e.g., a hinge connection).

In accordance with aspects of the disclosure, the hinge assembly 335 is operable to allow the tailgate 320 to pivot (using the second pivot connection 370) not only between the upright (or closed) position and the lowered (or open) position (e.g., in which the tailgate 320 is approximately parallel to the floor 315), but to also pivot (using both the first pivot connection 360 and the second pivot connection 370) beyond the lowered (or open) position so that the tailgate 320 is swingable underneath the floor 315.

Figure 3B:
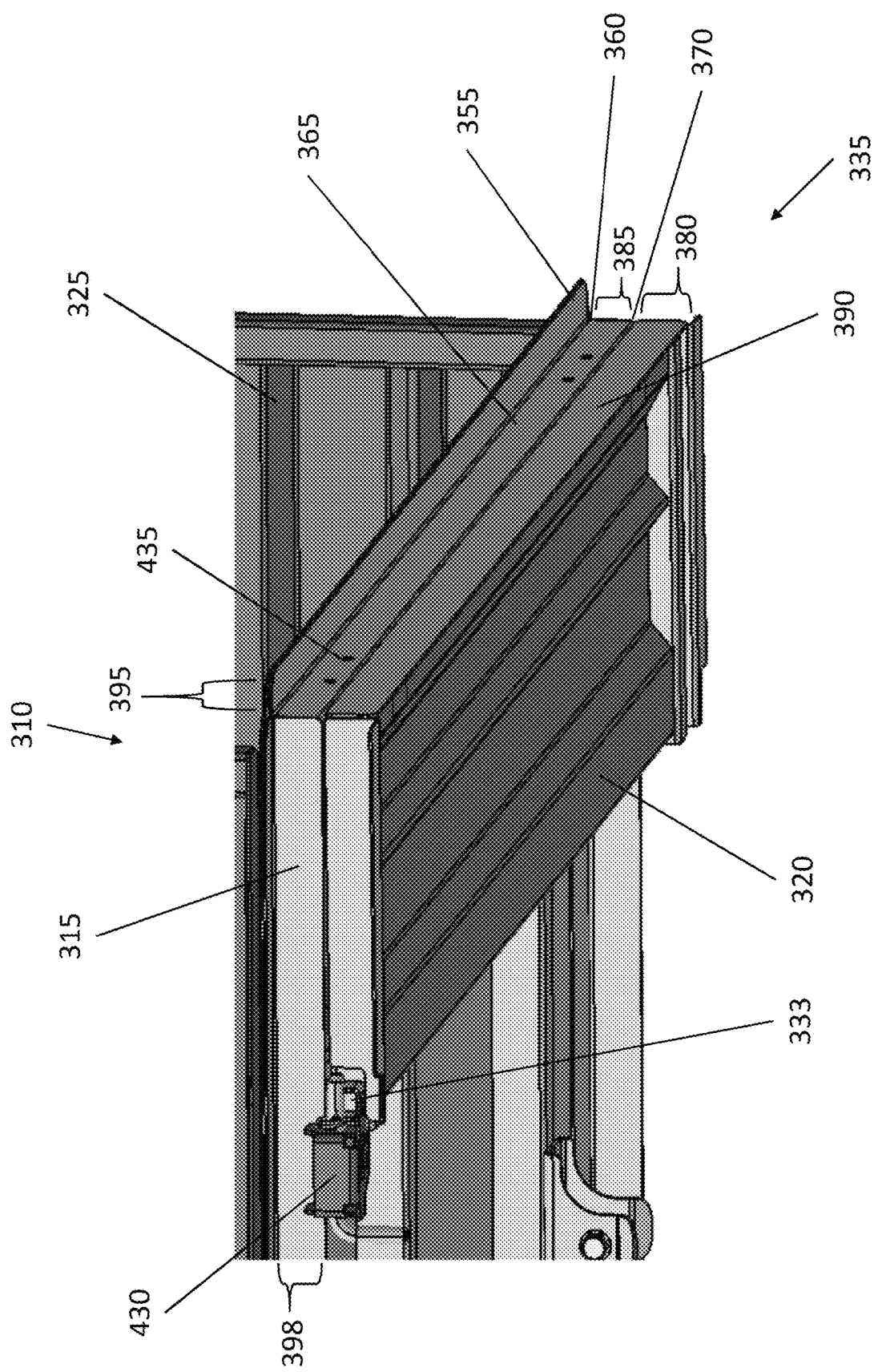
FIG. 3B shows a view of the exemplary tailgate of FIG. 3A in a stored position in accordance with aspects of the disclosure.

FIG. 3B shows a view of the exemplary tailgate 320 of FIG. 3A in a stored position underneath the floor 315 in accordance with aspects of the disclosure. As shown in FIG. 3B, in the stored position, the tailgate 320 is pivoted (using both the first pivot connection 360 and the second pivot connection 370) beyond the lowered (or open) position so that the tailgate 320 is swung underneath the floor 315. As shown in FIG. 3B, the floor 315 (or support frame thereof) also includes a locking mechanism 430 (e.g., a sliding pin) configured to engage with the engagement 333 (e.g., slot) on the tailgate 320, so that the tailgate 320 can be locked to the floor 315 (or support frame thereof) in the stored position.

As shown in FIG. 3B, when the tailgate 320 is in the stored position the extending surface 355 that projects rearwardly from the end of the floor 315 is viewable. Additionally, the swing plate 365 is viewable between the first pivot connection 360 and the second pivot connection 370.

In accordance with aspects of the disclosure, the width 385 of the swing plate 365 should be approximately equal to (or less than) the width 380 of a bottom surface 390 of the tailgate 320, and the extending length 395 of the extending surface 355 should be less than a width 385 of the swing plate 365. In such a manner, when the swing plate 365 is in a horizontal position, the second pivot connection 370 is beyond the free end of the extending surface 355, so that the tailgate 320 can swing (around second pivot connection 370) into the closed position.

Additionally, in accordance with aspects of the disclosure, the width 385 of the swing plate 365 should be approximately equal to the width 398 of the floor 315 (or support frame thereof). In such a manner, when the tailgate 320 is in the storage position (as shown in FIG. 3B), the tailgate 320 abuts (or is closely spaced to) an underside of the floor 315 (or support frame thereof). In some embodiments, the underside of the floor 315 (or support frame thereof) may include a dampening layer (e.g., rubber pad) to reduce noise and vibration between the tailgate 320 and the underside of the floor 315.

Figure 4A:
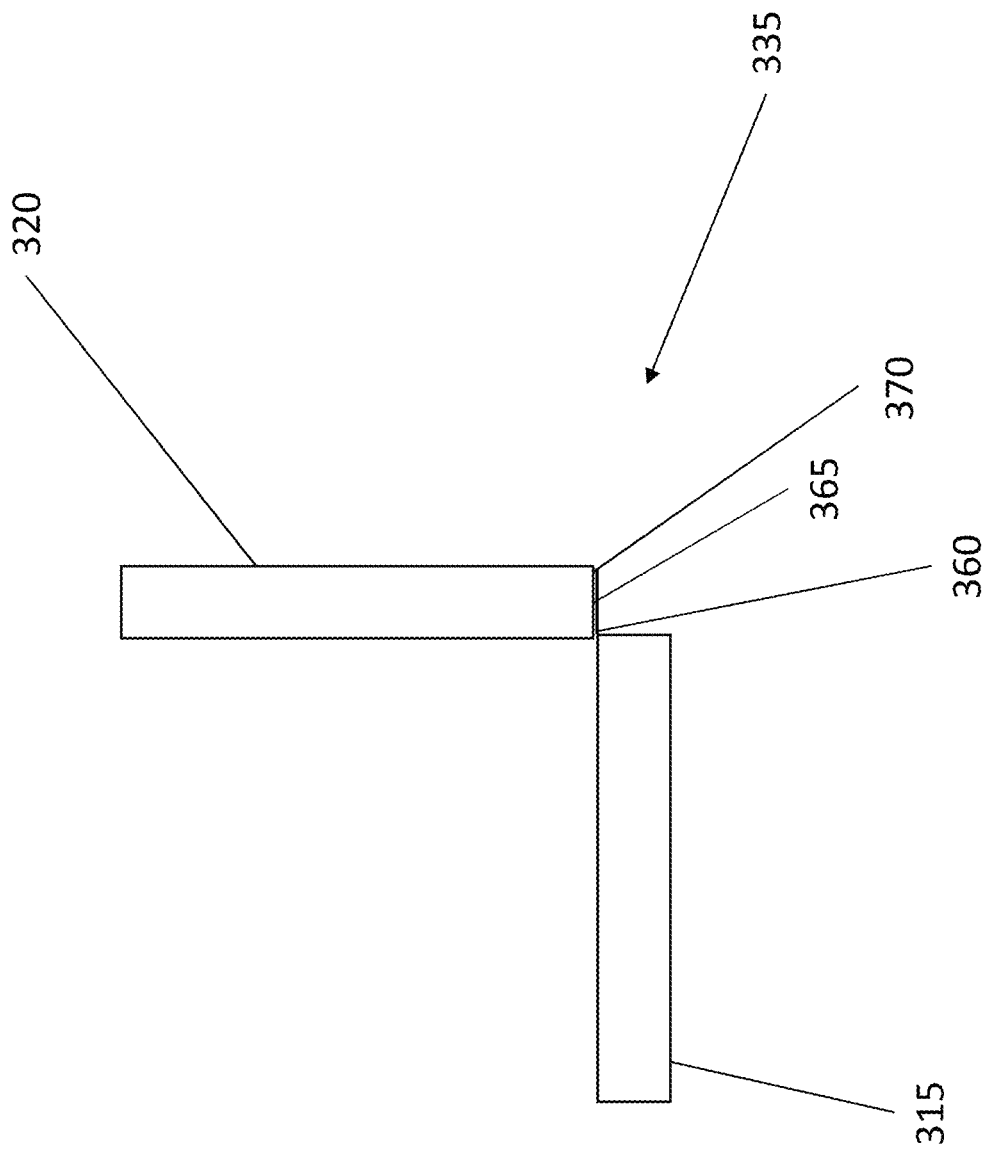

FIGS. 4A-4H show various schematic views of an exemplary tailgate 320 and hinge assembly 335 as the tailgate 320 is moved between a closed position (shown in FIG. 4A) and a stored position (shown in FIG. 4H) in accordance with aspects of the disclosure. As shown in FIG. 4A, the tailgate 320 is in a closed (upright) position relative to the floor 315. The hinge assembly 335 includes a first pivot connection 360 between the floor 315 and a swing plate 365, and a second pivot connection 370 between the swing plate 365 and the tailgate 320. The floor 315 (or support frame thereof) supports an extending surface (not shown in FIG. 4A) that projects rearwardly from an end of the floor 315. When the tailgate 320 is in the closed position, the tailgate 320 is supported on the extending surface.

Figure 4B:
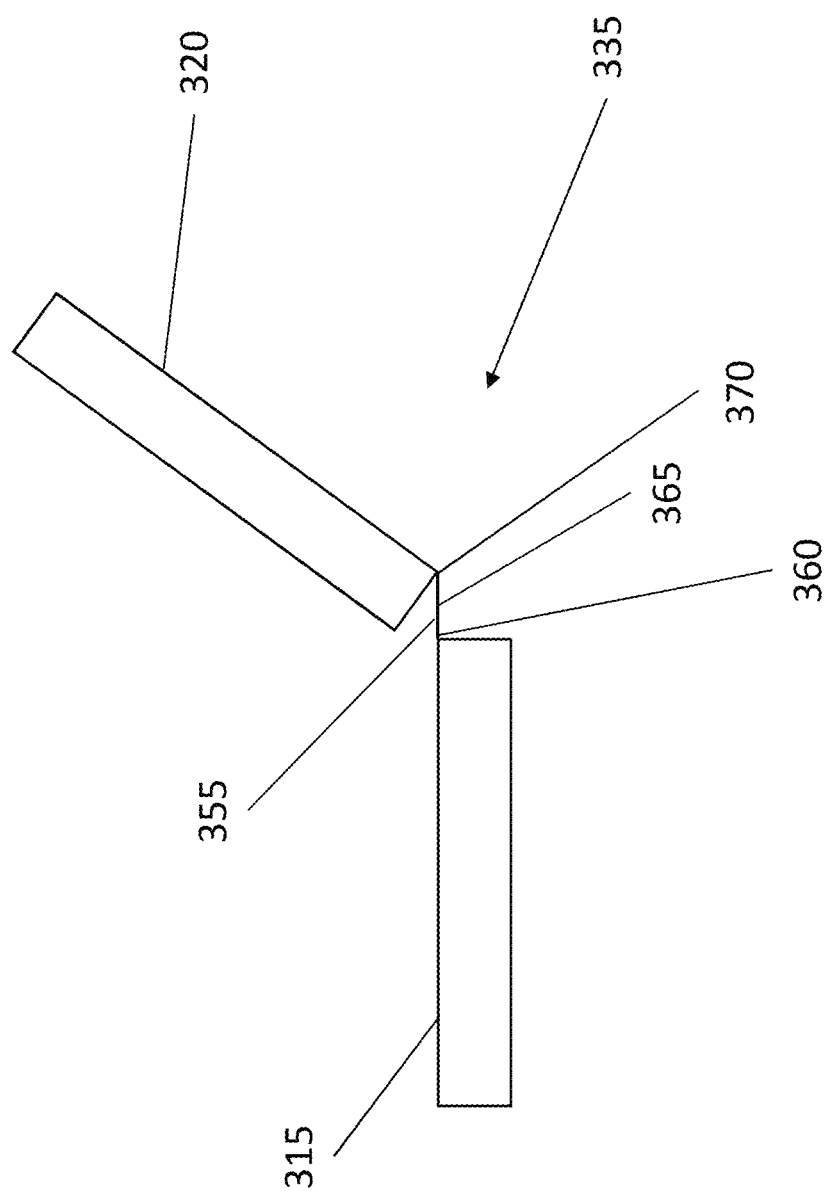

As shown in FIG. 4B, as the tailgate 320 is moved from the closed position towards the open position (i.e., wherein the tailgate is approximately parallel to the floor 315), the tailgate 320 rotates around the second pivot connection 370 (e.g., a hinge connection). As the tailgate 320 rotates around the second pivot connection 370, the extending surface 355 is exposed.

Figure 4C:
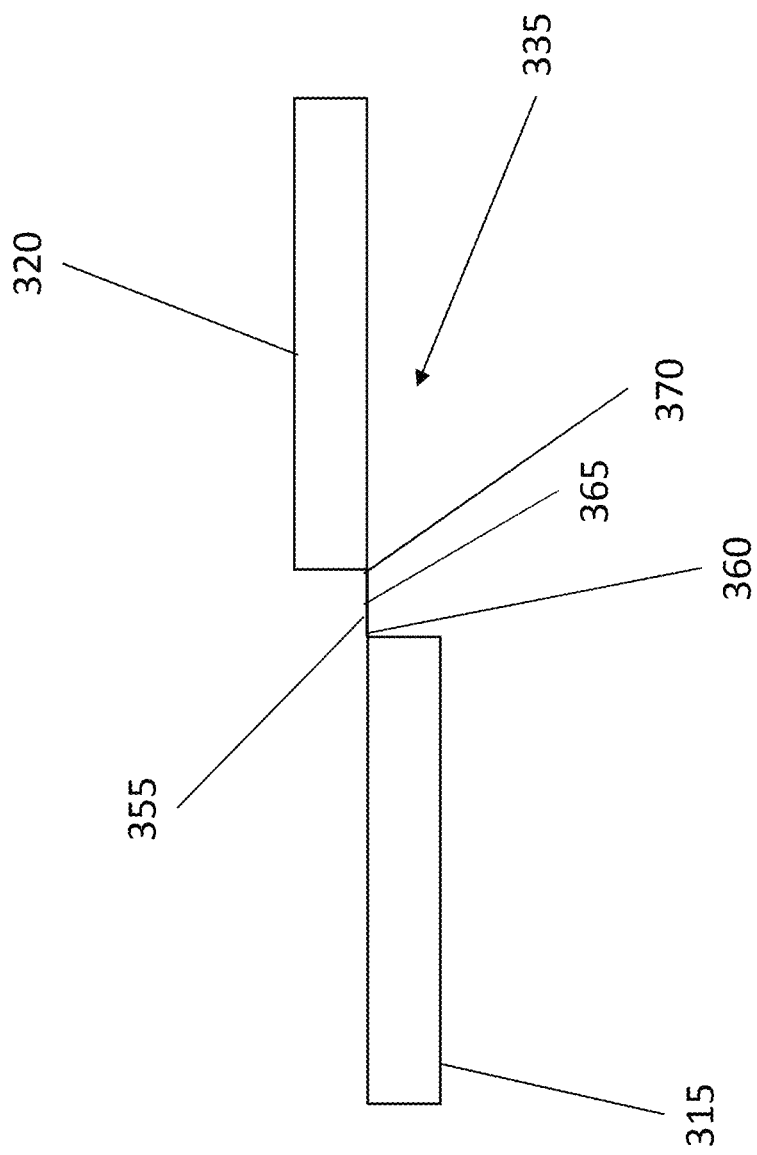
Figure 4D:
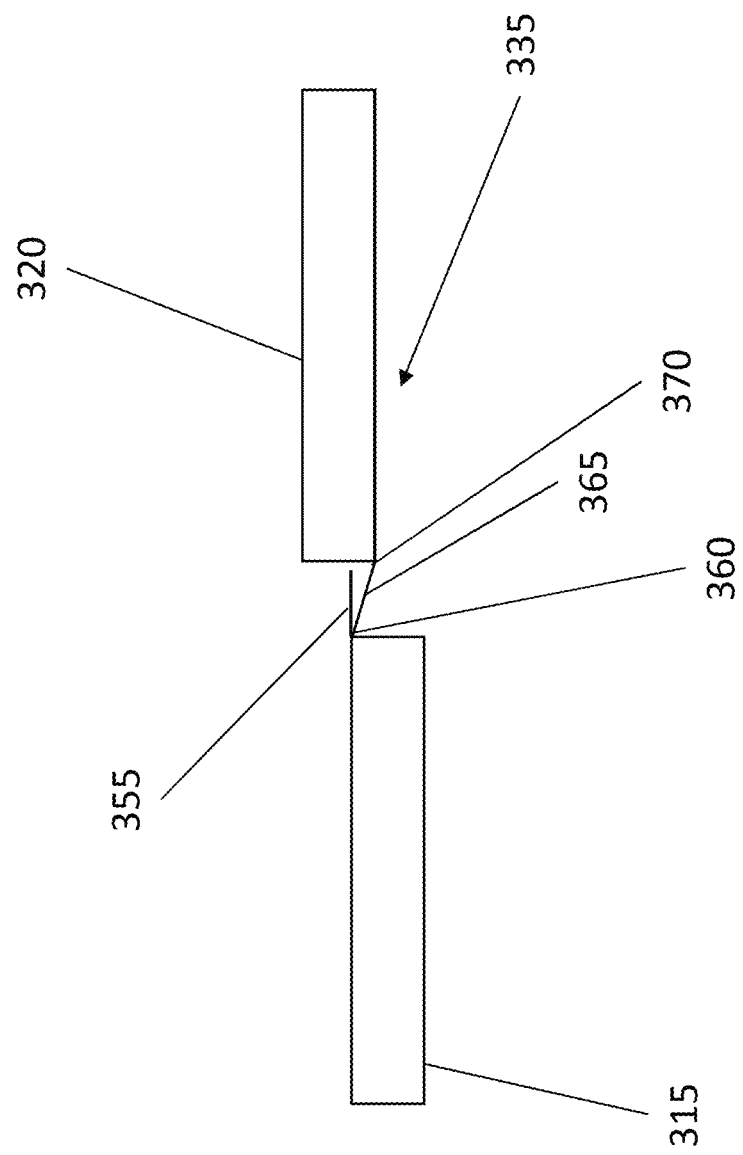

As shown in the schematic depiction of FIG. 4C, through further rotation around the second pivot connection 370, the tailgate 320 is moved to the open position (i.e., wherein the tailgate is approximately parallel to the floor 315). As shown in FIG. 4D, as the tailgate 320 is moved downwardly (e.g., via releasing of support cables between the side walls and the tailgate), the swing plate 365 begins to rotate around the first pivot connection 360 as the tailgate 320 continues to rotate around the second pivot connection 370.

Figure 4E:
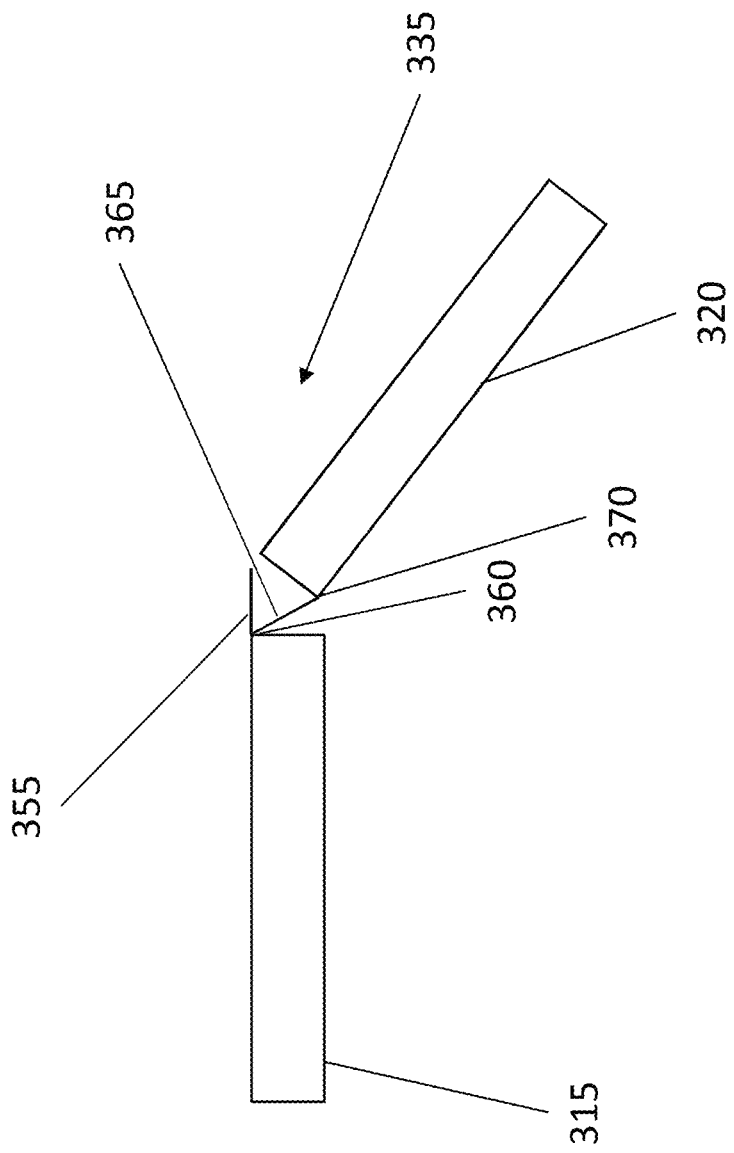
Figure 4H:
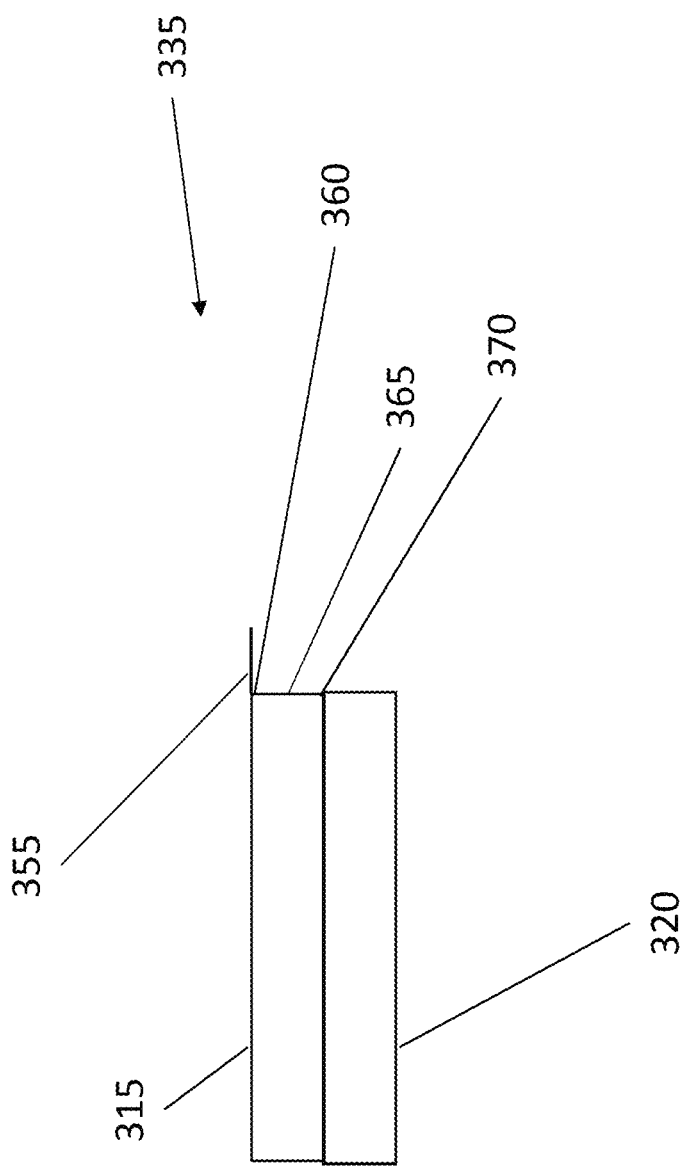

As shown in FIG. 4E, as the tailgate 320 continues to move downwardly, the swing plate 365 continues to rotate around the first pivot connection 360 as the tailgate 320 continues to rotate around the second pivot connection 370. As shown in FIG. 4F, as the tailgate 320 continues to move downwardly, the swing plate 365 abuts the end face of the floor 315 and stops rotating around the first pivot connection 360 as the tailgate 320 continues to rotate around the second pivot connection 370. As shown in FIG. 4G, as the tailgate 320 continues to move downwardly, the tailgate 320 continues to rotate around the second pivot connection 370. By doing so, as shown in FIG. 4G, the tailgate 320 is swung under the floor 315. Finally, in FIG. 4H, the tailgate 320 is moved upwardly as the tailgate 320 continues to rotate around the second pivot connection 370 until the tailgate 320 abuts (or is arranged in close proximity to) the underside of the floor 315 (or a support frame thereof). Once in the stored position shown schematically in FIG. 4H, the tailgate 320 may be locked to the floor 315 (or support frame thereof) with a locking mechanism (not shown).

Figure 5:
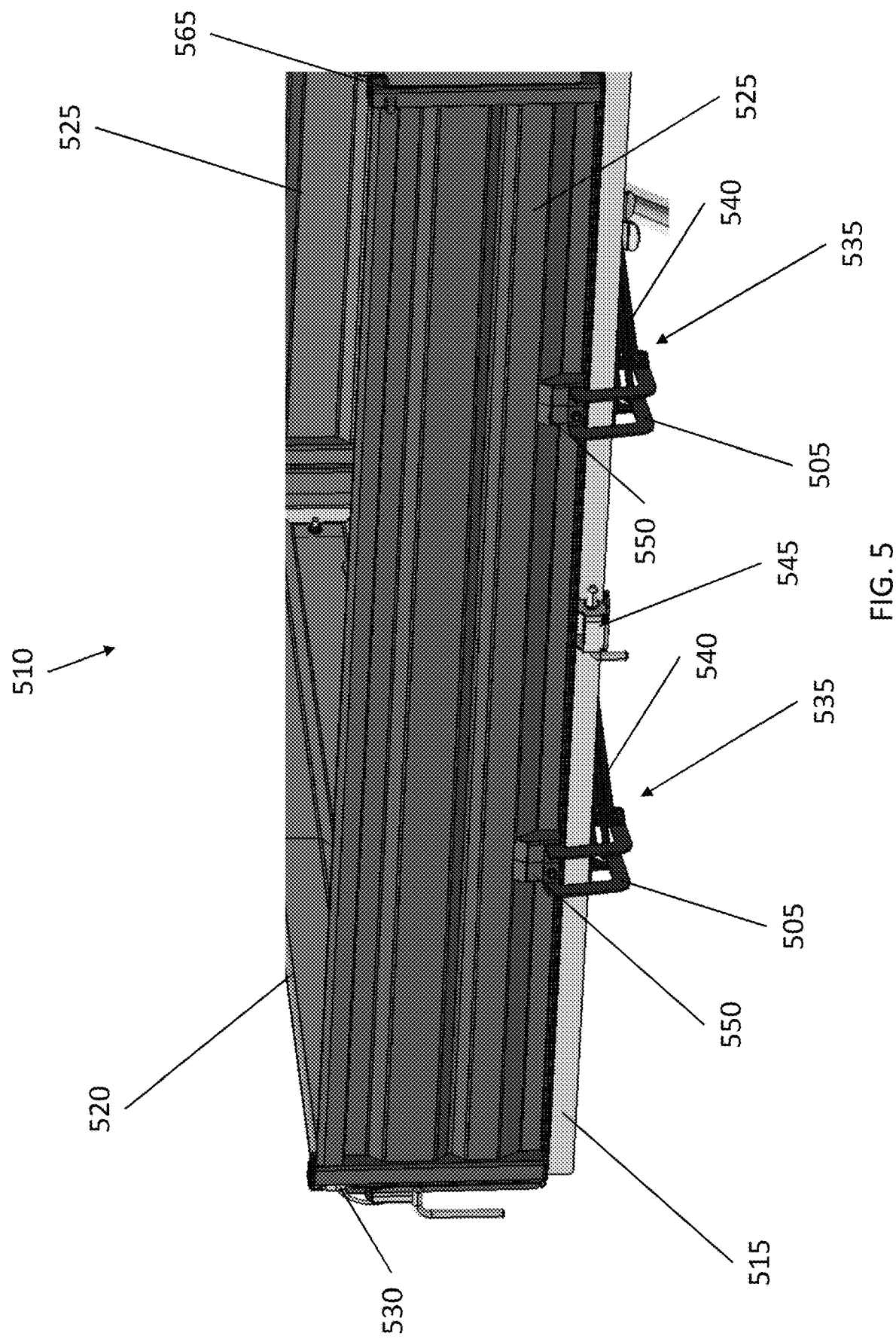
FIG. 5 shows a view of an exemplary cargo bed having storable sidewalls arranged in an upright position in accordance with aspects of the disclosure.

FIG. 5 shows a view of an exemplary cargo bed 510 having storable sidewalls 525 arranged in an upright position in accordance with aspects of the disclosure. As shown in FIG. 5, the cargo bed 510 includes a floor 515, the sidewalls 525, a front wall 565, and a tailgate 520. The cargo bed 510 also includes a locking mechanism 530 (e.g., a pin) on the side walls 525 configured to engage with an engagement on the tailgate 520, so that the tailgate 520 can be locked to the side walls 525 in the closed position.

As shown in FIG. 5, the sidewall 525 is pivotably (or swingably) attached to the floor 515 via a pivot/slide assembly 535. With an exemplary and non-limiting embodiment, the pivot/slide assembly 535 includes a pair of pivot arms 505 that attach to the side wall 525 via reinforcement structures 550. The pivot arms 505 engage with respective pivot/slide bearings 540, which are attached (e.g. via fasteners and/or welds) to an underside of the floor 515 (or a support frame thereof). As shown in FIG. 5, the floor 515 (or a support frame thereof) includes a locking mechanism 545 (e.g., a sliding pin in a bearing).

Figure 6:
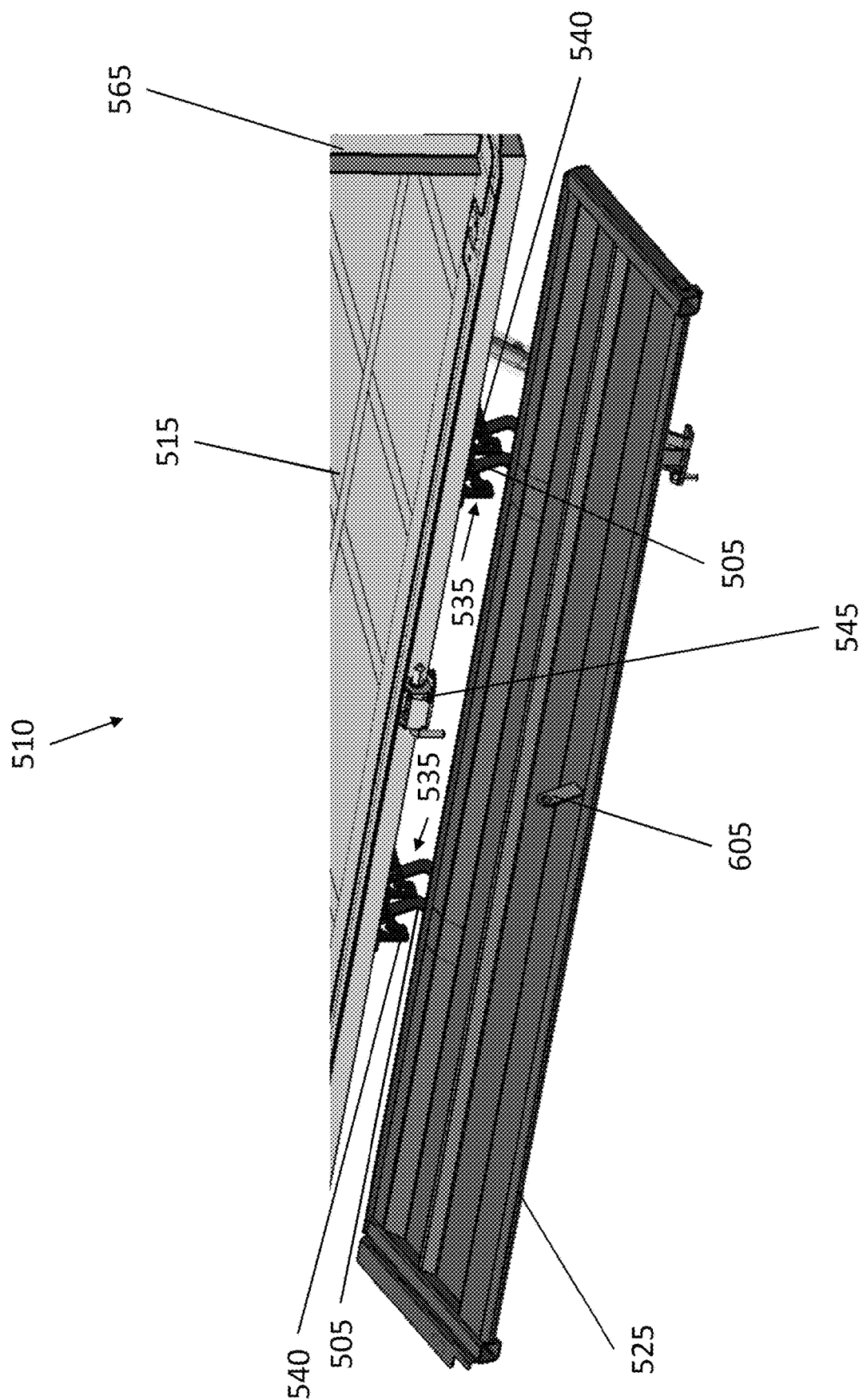
FIG. 6 shows a view of the cargo bed having a storable sidewall of FIG. 5 in an open position in accordance with aspects of the disclosure.

FIG. 6 shows a view of the cargo bed 510 having a storable sidewall 525 of FIG. 5 in an open position in accordance with aspects of the disclosure. As shown in FIG. 6, the sidewall 525 is pivotably (or swingably) attached to the floor 515 via the pivot/slide assembly 535. In the open position, the sidewall 525 is approximately parallel with the floor 515 (or bed). While not shown in FIG. 6, in some exemplary and non-limiting embodiments, the sidewall 525 may be supportable in the open position via support cables running from top corners of the sidewall to the front wall and the tailgate (or a vertical post, for example).

As shown in FIG. 6, in the open position, the pivot arms 505 engage with a pivot portion of the respective pivot/slide bearings 540, which are attached to the underside of the floor 515 (or a support frame thereof). As shown in FIG. 6, an inner surface of the sidewall 525 includes a locking protrusion 605 (e.g., having a pin hole) configured to engage with the locking mechanism 545 (e.g., a sliding pin in a bearing).

Figure 7:
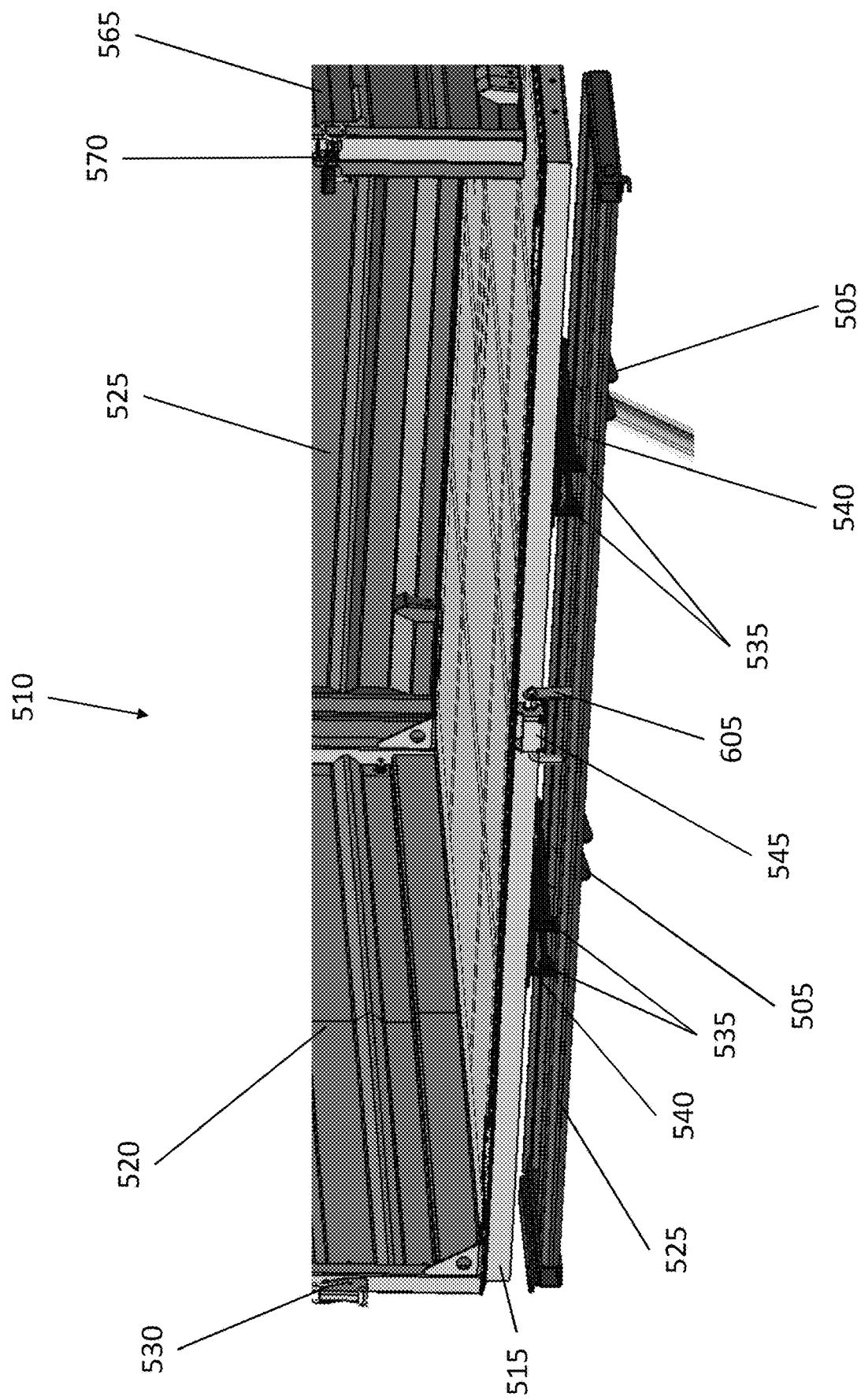
FIG. 7 shows a view of the cargo bed having a storable sidewall of FIG. 5 in in a stored position in accordance with aspects of the disclosure.

FIG. 7 shows a view of the cargo bed 510 having a storable sidewall 525 of FIG. 5 in in a stored position in accordance with aspects of the disclosure. As shown in FIG. 7, in the stored position, the pivot arms 505 engage with a slide portion of the respective pivot/slide bearings 540, which are attached to the underside of the floor 515 (or a support frame thereof). As shown in FIG. 7, in the stored position, the locking protrusion 605 is in position to engage with the locking mechanism 545 so as to retain the sidewall 525 in the storage position. That is, as shown in FIG. 7, the pin of the locking mechanism 545 (e.g., the sliding pin in the bearing) is passed through the hole in the locking protrusion 605. In such a manner, with this exemplary and non-limiting embodiment, the sidewall 525 can be prevented from moving out of the storage position under the floor 515 of the cargo bed 510. While not shown in FIGS. 5-7, it should be understood that the other sidewall 525 is structured similarly (e.g., symmetrically) and functions in a similar manner.

Figure 8:
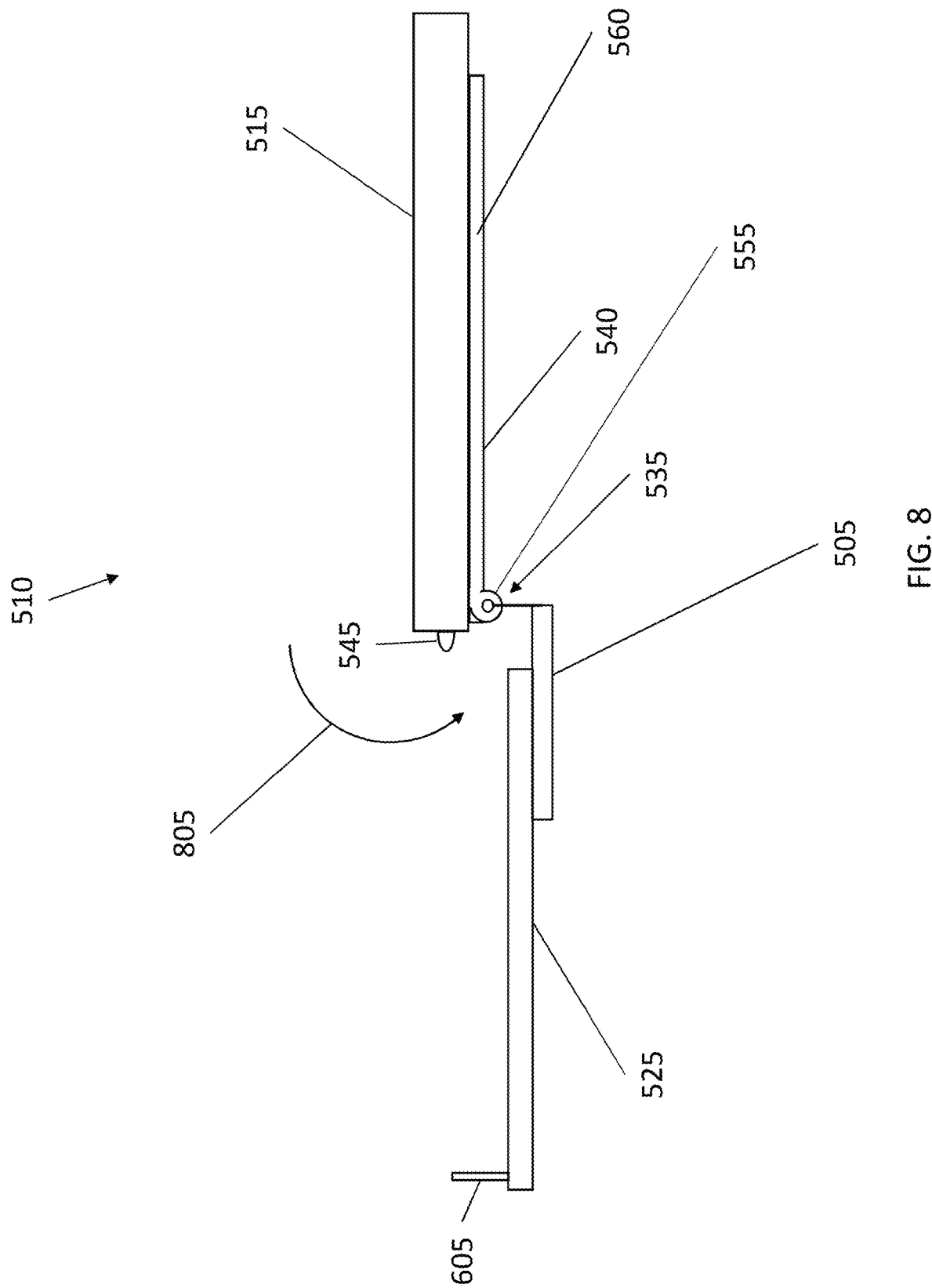
FIG. 8 shows a side schematic view of an exemplary cargo bed having a storable sidewall arranged in an open position in accordance with aspects of the disclosure.

FIG. 8 shows a side schematic view of an exemplary cargo bed 510 having a storable sidewall 525 arranged in an open position in accordance with aspects of the disclosure. As shown in FIG. 8, the sidewall 525 is moved to the open position by rotating the sidewall 525 in direction 805. The sidewall 525 rotates in direction 805 via the pivot arm 505 engagement with a pivot portion 555 of a respective pivot/slide bearing 540. As shown in FIG. 8, the pivot/slide bearing 540 is attached to the underside of the floor 515 (or a support frame thereof). The pivot arm 505 may be maintained in pivot portion 555 by gravity. In other contemplated embodiments, a releasable latching mechanism may be utilized to selectively retain the pivot arm 505 in pivot portion 555. An inner surface of the sidewall 525 includes a locking protrusion 605 (e.g., having a pin hole) configured to engage with a locking mechanism 545 (e.g., a sliding pin in a bearing).

Figure 9:
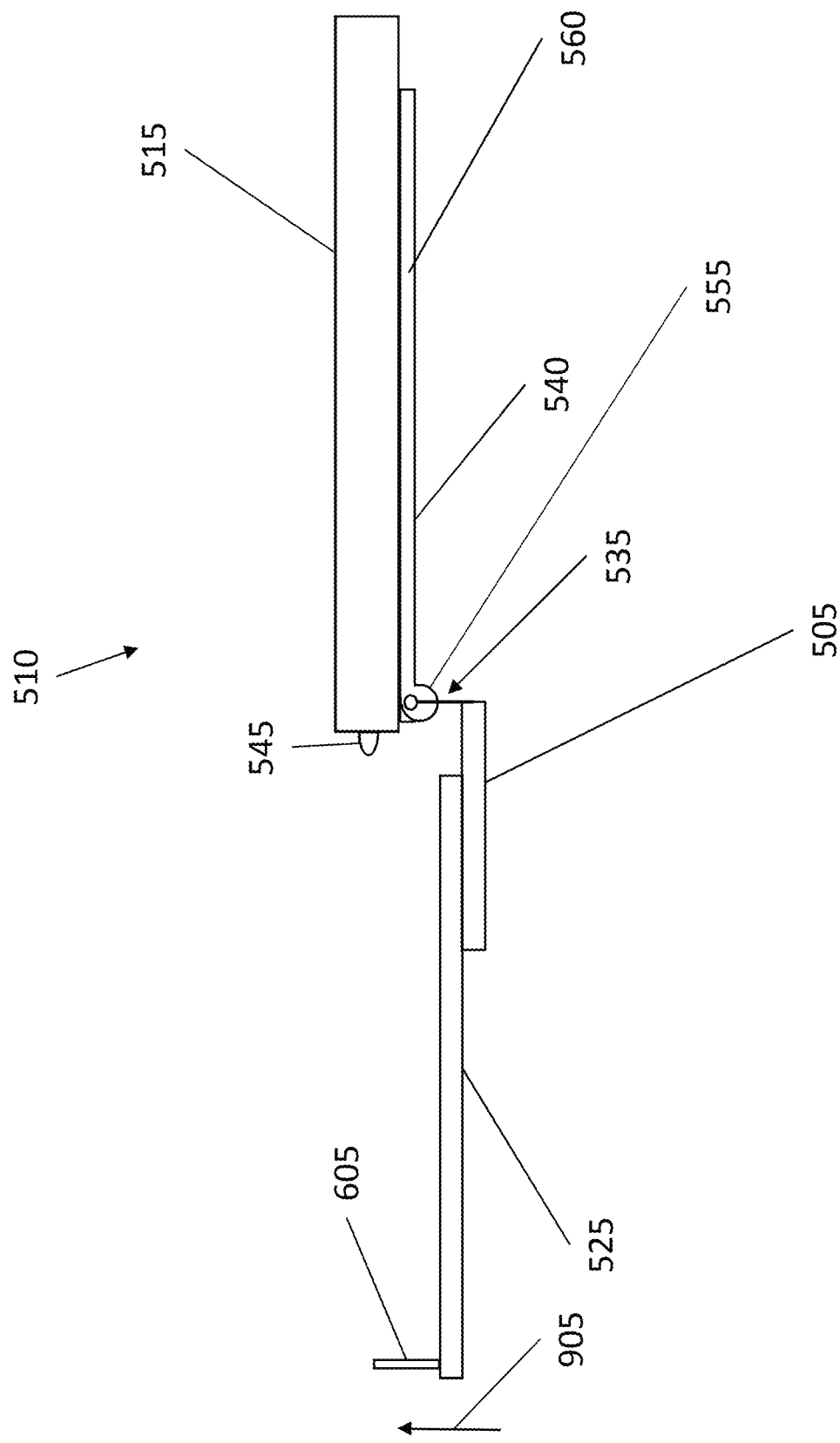
FIG. 9 shows a side schematic view of the exemplary cargo bed having a storable sidewall arranged in a lifted position in accordance with aspects of the disclosure.

FIG. 9 shows a side schematic view of the exemplary cargo bed 510 having a storable sidewall 525 arranged in a lifted position in accordance with aspects of the disclosure. As shown in FIG. 9, when the sidewall 525 is in the lifted position (by moving the sidewall 525 in direction 905), with this exemplary embodiment, the pivot arm 505 is released from engagement from the pivot portion 555 of the pivot/ slide bearing 540. In accordance with aspects of the disclosure, once the pivot arm 505 is released from engagement from the pivot portion 555, the sidewall 525 may be slid laterally as the pivot arm 505 slides in the slide portion 560 of the pivot/slide bearing 540.

Figure 10:
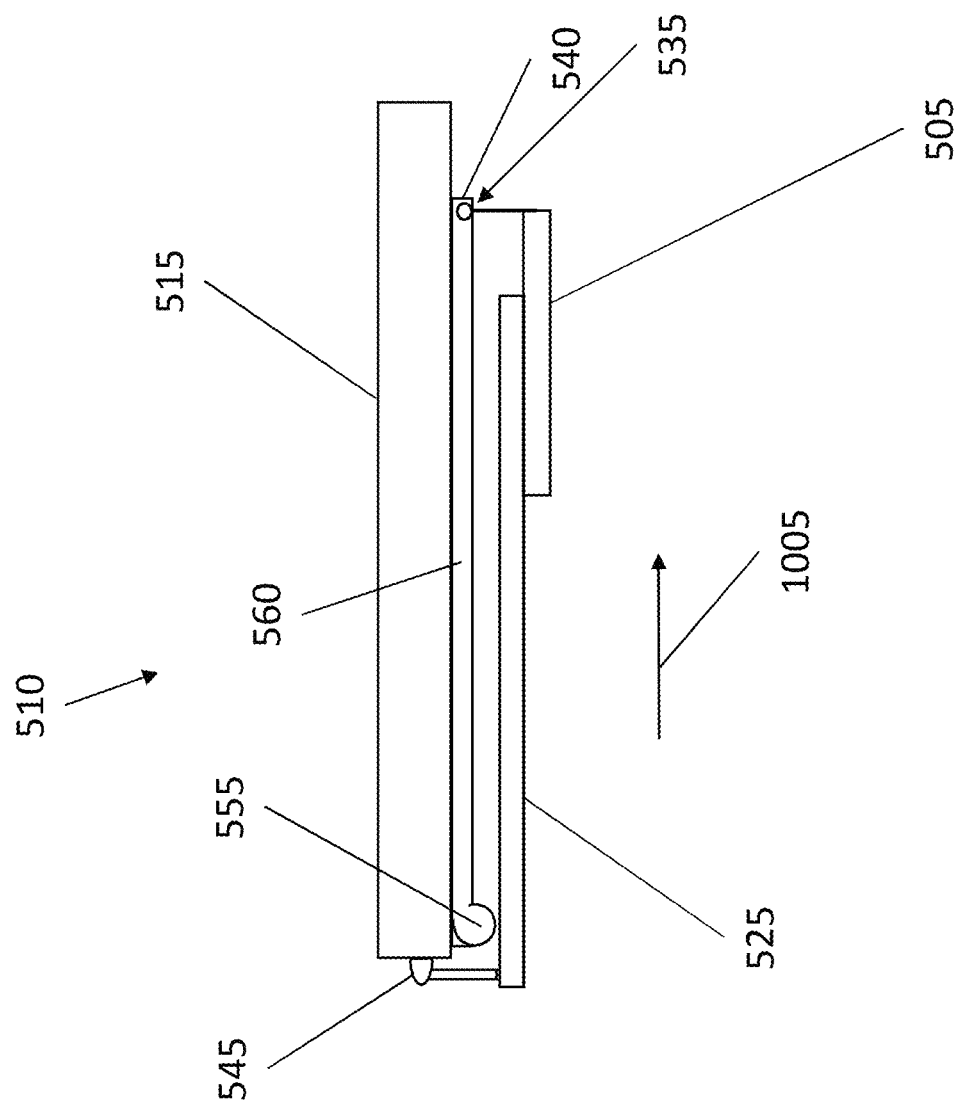
FIG. 10 shows a side schematic view of the exemplary cargo bed having a storable sidewall arranged in a stored position in accordance with aspects of the disclosure.

FIG. 10 shows a side schematic view of the exemplary cargo bed 510 having the storable sidewall 525 arranged in a stored position in accordance with aspects of the disclosure. As shown in FIG. 10, in the stored position, the sidewall 525 is slid laterally in direction 1005 as the pivot arm 505 slides in the slide portion 560 of the pivot/slide bearing 540 (e.g., to a terminal end of the pivot/slide bearing 540). While not shown in FIG. 10, in some contemplated embodiments the pivot/slide bearing 540 may have a detent region for the pivot arm 505 at the terminal end of the pivot/slide bearing 540 to assist in retaining the sidewall 525 in the stored position (via a pivot end of the pivot arm 505 being received in the detent region).

Figure 11A:
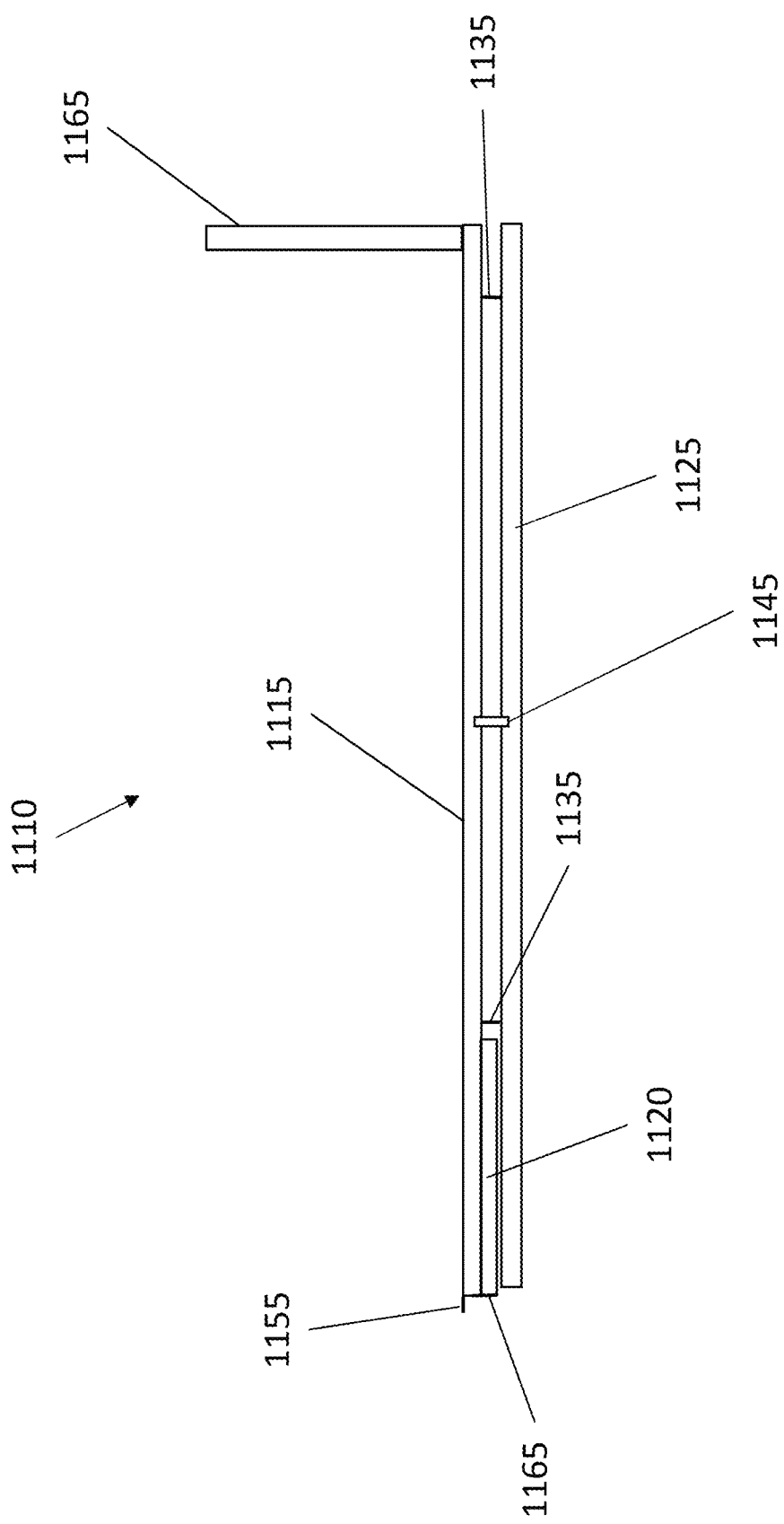
FIG. 11A shows a side schematic view of an exemplary cargo bed with a storable sidewall and a storable tailgate in respective stored positions under a floor of the cargo bed in accordance with aspects of the disclosure.

FIG. 11A shows a side schematic view of an exemplary cargo bed 1110 with a storable sidewall 1125 and a storable tailgate 1120 in respective stored positions under a floor 1115 of the cargo bed 1110 in accordance with aspects of the disclosure. For example, the storable tailgate 1120 may be the storable tailgate 320 of FIGS. 3A-4H, and the storable sidewall 1125 may be the storable sidewall 525 of FIGS. 5-10. With other contemplated embodiments, however, the storable tailgate may utilize a pivot and slide storage mechanism similar to that of the storable sidewall 525 of FIGS. 5-10. In yet additional contemplated embodiments, (for example, where clearance permits, e.g., when the cargo bed is in a raised position) the storable sidewalls may utilize a hinge assembly to pivot into a storage position in a similar manner to the storable tailgate 320 of FIGS. 3A-4H. With such an embodiment, arranging the sidewalls in the stored position may first include raising the cargo bed to an inclined (or raised) position, for example, to provide sufficient clearance for the swinging range of the sidewalls.

Additionally, as should be understood, some embodiments of the present disclosure may include a cargo bed with storable tailgate and sidewalls that are not storable (e.g., that is removable). Other contemplated embodiments may include a cargo bed with storable sidewalls and a tailgate that is not storable (e.g., that is removable). For example, depending on the space of the vehicle, with some UTV configurations, the slidingly-storable side walls may be more easily accommodateable than a foldingly-storable (or slidingly-storable) tailgate. On the other hand, a UTC with a longer cargo bed, a foldingly-storable (or slidingly-storable) tailgate may be more easily accommodateable than storable side walls.

As shown in FIG. 11A, an extending portion 1155 extends from a rear end of the floor 1115, and a swing plate 1165 connects the tailgate 1120 to the floor 1115 (or support frame therefor). The sidewall 1125 is supported in the stored position by the pivot/slide assemblies 1135 and a locking mechanism 1145.

In accordance with aspects of the disclosure, as shown in FIG. 11A, when in the stored position, the tailgate 1120 is arranged closer to an underside the floor 1115 (or support frame therefor), for example, in an abutting manner, and the sidewalls 1125 (only one shown) are arranged beneath the tailgate 1120. As such, the pivot/slide assemblies 1135 are configured (e.g., sized) to provide sufficient space to accommodate the tailgate 1120 above the side walls 1125 (e.g., when both tailgate 1120 and the sidewalls 1125 in the stored position as shown in FIG. 11A). With such a configuration, an operator may first move (e.g. pivot) the tailgate 1120 into its storage position, and thereafter move (e.g., pivot and slide) the sidewalls 1125 into their respective storage positions. In accordance with aspects of the disclosure, with this exemplary configuration, when in the stored positions, the sidewalls 1125 may assist in retaining the tailgate 1120 in its storage position. That is, when the sidewalls 1125 are in their respective storage positions, as shown in FIG. 11A, the tailgate 1120 is effectively prevented from swinging out of its storage position.

Figure 11B:
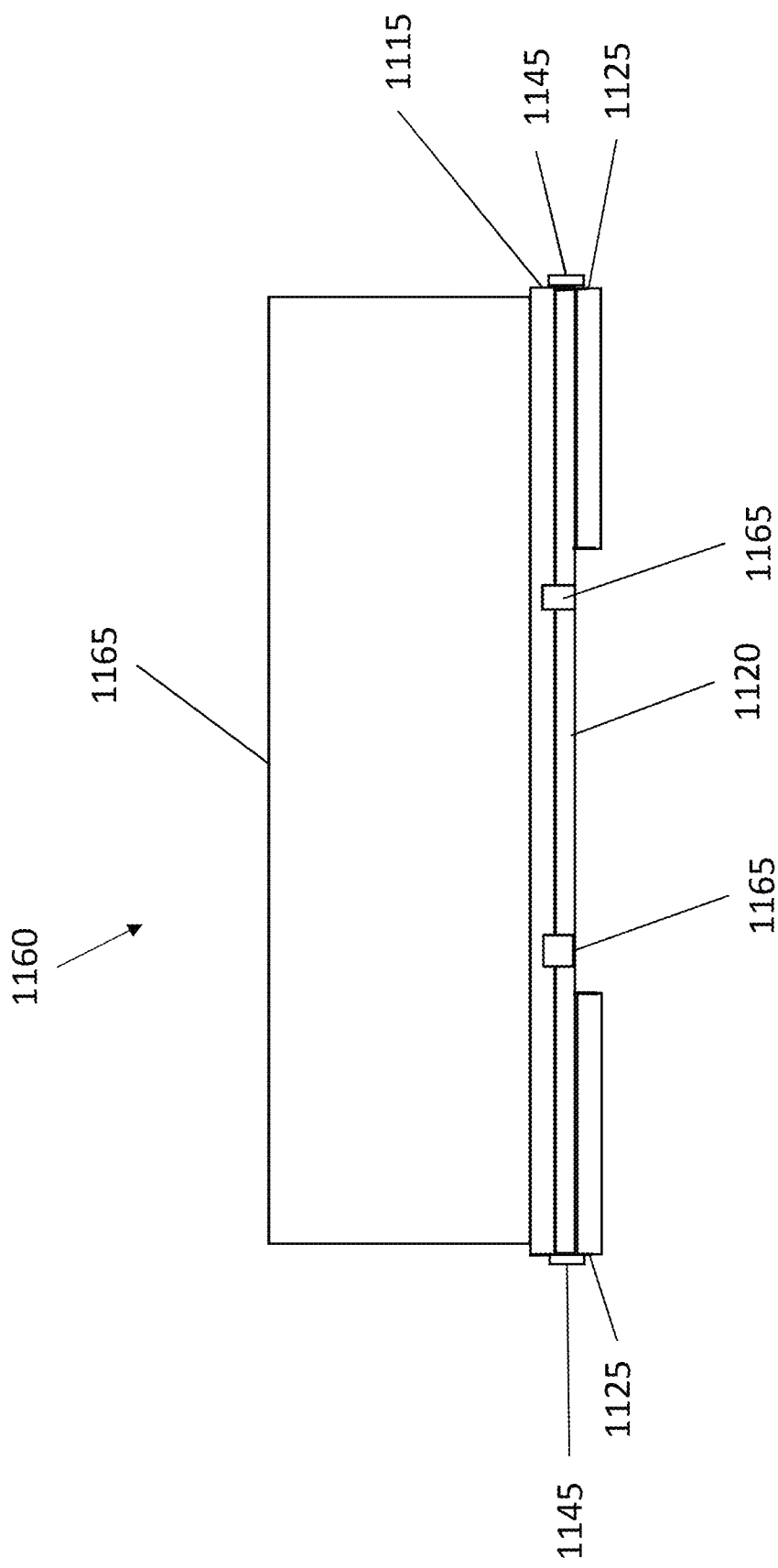
FIG. 11B shows a rear schematic view of an exemplary cargo bed with storable sidewalls and a storable tailgate in respective stored positions under a floor of the cargo bed in accordance with aspects of the disclosure.

FIG. 11B shows a rear schematic view of an exemplary cargo bed 1110 with storable sidewalls 1125 and a storable tailgate 1120 in respective stored (or storage) positions under a floor 1115 of the cargo bed 1110 in accordance with aspects of the disclosure. As shown in FIG. 11B, with this exemplary and non-limiting embodiment, when in the stored position, the tailgate 1120 is arranged closer to an underside the floor 1115 (or support frame therefor), for example, in an abutting manner, and the sidewalls 1125 are arranged beneath the tailgate 1120. As such, the pivot/slide assemblies (not shown in FIG. 11B) are configured (e.g., sized) to provide sufficient space to accommodate the tailgate 1120 above the side walls 1125 (e.g., when both tailgate 1120 and the sidewalls 1125 in the stored positions as shown in FIG. 11B). As shown in FIG. 11B, with this exemplary embodiment, a plurality of swing plates 1165 connect the tailgate 1120 to the floor 1115 (or support frame therefor). The sidewalls 1125 are supported in the stored position by the pivot/slide assemblies (not shown) and respective locking mechanisms 1145. As discussed above, in accordance with aspects of the disclosure, with this exemplary configuration, when in the stored positions, the sidewalls 1125 may assist in retaining the tailgate 1120 in its storage position. That is, when the sidewalls 1125 are in their respective storage positions they obstruct sufficient movement of the tailgate, as shown in FIG. 11B, and as such, the tailgate 1120 is effectively prevented from swinging out of its storage position.

Figure 12A:
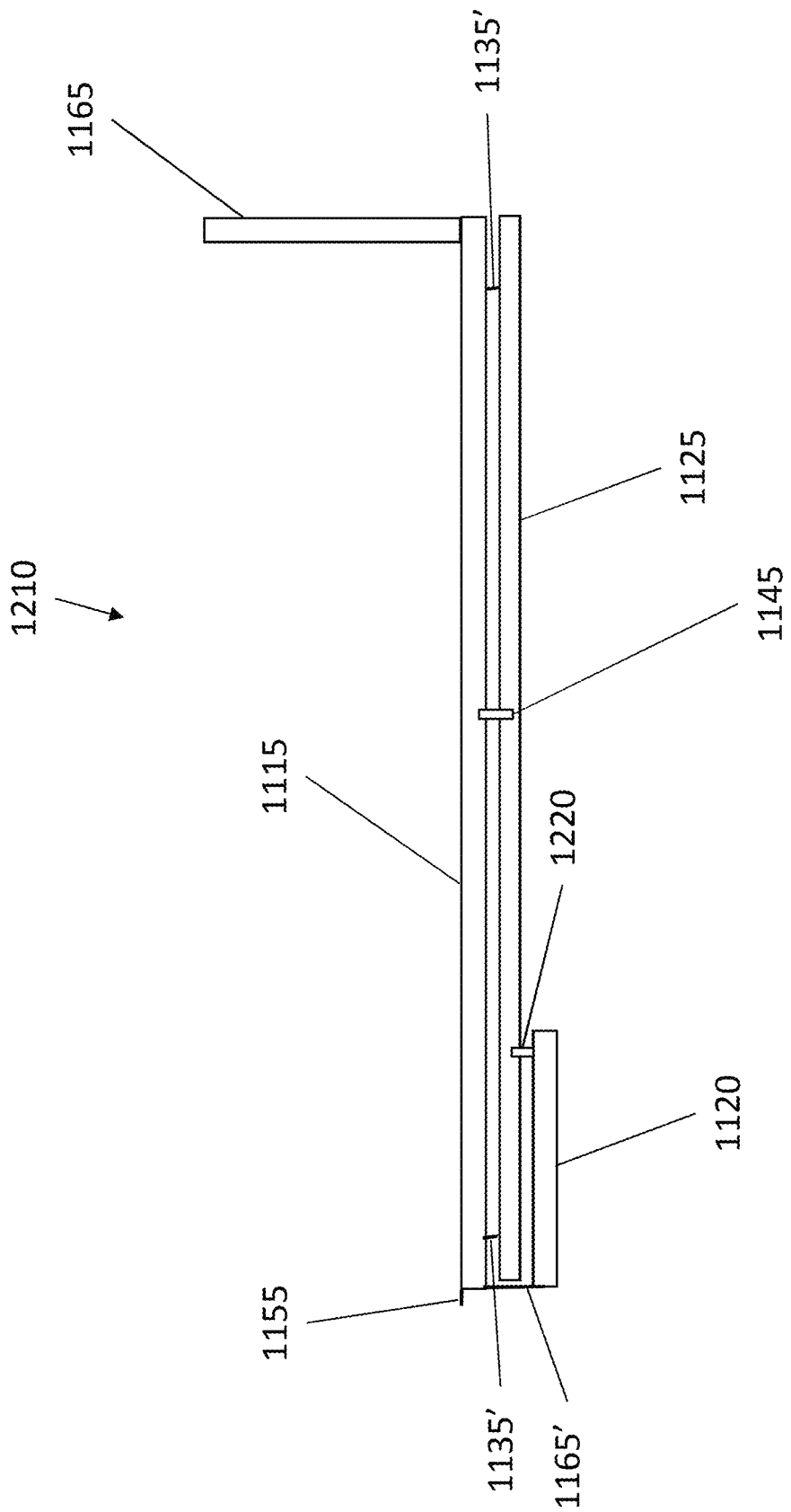
FIG. 12A shows a side schematic view of an exemplary cargo bed with a storable sidewall and a storable tailgate in respective stored positions under a floor of the cargo bed in accordance with aspects of the disclosure.

FIG. 12A shows a side schematic view of an exemplary cargo bed 1210 with a storable sidewall 1125 and a storable tailgate 1120 in respective stored positions under a floor 115 of the cargo bed 1110 in accordance with aspects of the disclosure. For example, the storable tailgate 1120 may be similar to the storable tailgate 320 of FIGS. 3A-4H, and the storable sidewall 1125 may be the storable sidewall 525 of FIGS. 5-10. As shown in FIG. 12A, an extending portion 1155 extends from a rear end of the floor 1115, and a swing plate 1165' connects the tailgate 1120 to the floor 1115 (or support frame therefor). The sidewall 1125 is supported in the stored position by the pivot/slide assemblies 1135' and a locking mechanism 1145 (or a plurality of locking mechanisms).

In accordance with aspects of the disclosure, as shown in the exemplary embodiment of FIG. 12A, when in the stored position, the sidewalls 1125 (only one shown) are arranged closer to an underside of the floor 1115 (or support frame therefor), and the tailgate 1120 is arranged beneath the sidewalls 1125. As such, the swing plate 1165' may configured (e.g., sized) to provide sufficient space to accommodate the sidewalls 1125 above the tailgate 1120 (e.g., when both tailgate 1120 and the sidewalls 1125 in the stored position as shown in FIG. 12A). With such a configuration, an operator may first move (e.g., pivot and slide) the sidewalls 1125 into their respective storage positions, and thereafter move (e.g. pivot) the tailgate 1120 into its storage position. In accordance with aspects of the disclosure, with this exemplary configuration, when in the stored positions, the tailgate 1120 may assist in retaining the sidewalls 1125 in their respective storage positions (e.g., with one or more protrusions 1220 that contact, engage with recess in and/or otherwise retain the sidewalls 1125).

Figure 12B:
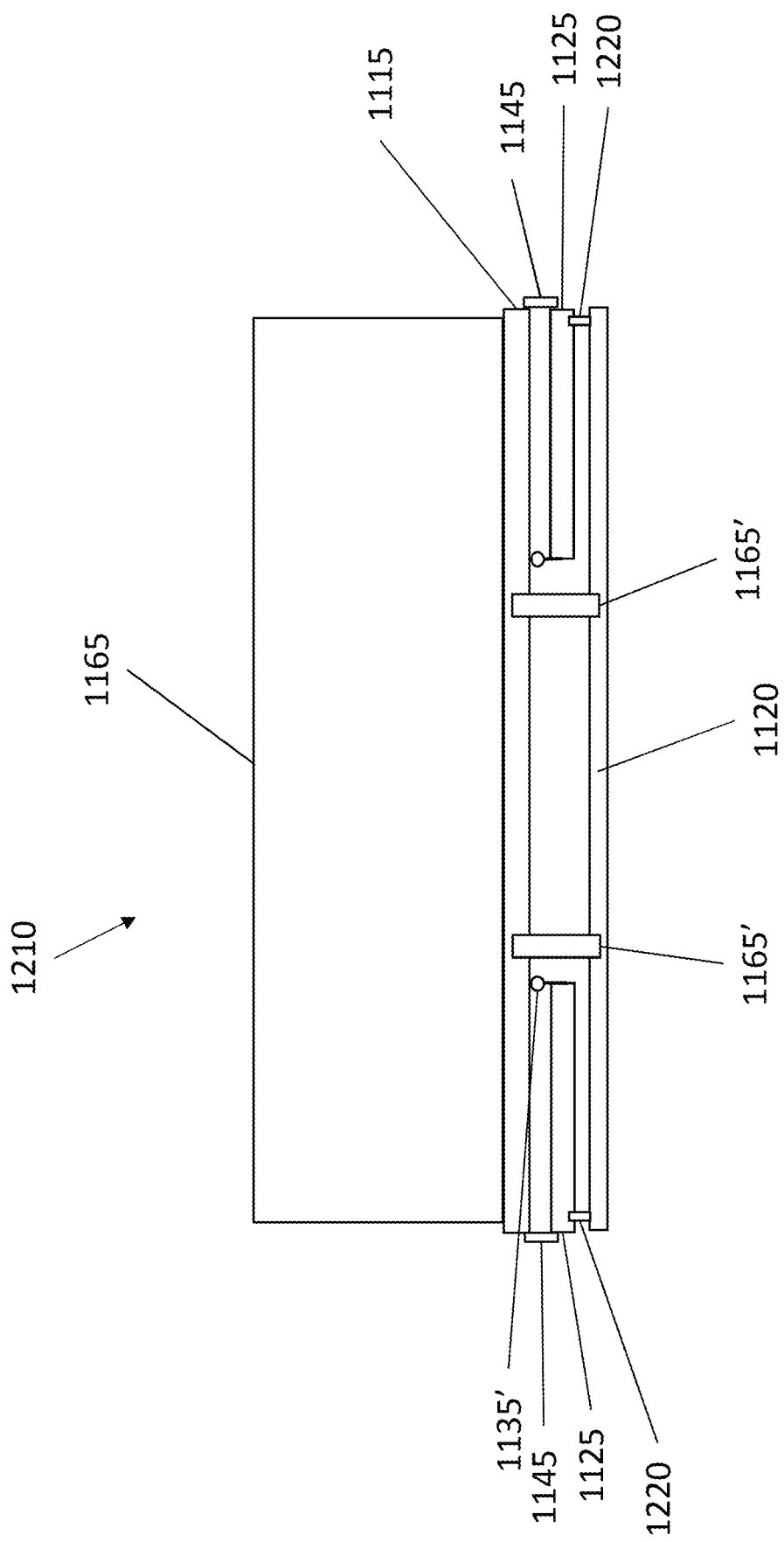
FIG. 12B shows a rear schematic view of an exemplary cargo bed with storable sidewalls and a storable tailgate in respective stored positions under a floor of the cargo bed in accordance with aspects of the disclosure.

FIG. 12B shows a rear schematic view of an exemplary cargo bed 1110 with storable sidewalls 1125 and a storable tailgate 1120 in respective stored positions under a floor 1115 of the cargo bed 1110 in accordance with aspects of the disclosure. As shown in FIG. 12B, with this exemplary and non-limiting embodiment, when in the stored position, the tailgate 1120 is arranged further from an underside the floor 1115 (or support frame therefor). As such, the pivot/slide assemblies 1235' may be configured (e.g., sized) so that the sidewalls (when in a stored position) are closer to the underside of the floor 1115. As shown in FIG. 12B, with this exemplary embodiment, a plurality of swing plates 1165' connect the tailgate 1120 to the floor 1115 (or support frame therefor). The sidewalls 1125 are supported in the stored position by the pivot/slide assemblies 1135' and respective locking mechanisms 1145. As shown in FIG. 12B, the tailgate 1120 (when in the stored position) may assist in retaining the sidewalls 1125 in their respective storage positions (e.g., with one or more protrusions 1220 that contact, engage with recess in and/or otherwise retain the sidewalls 1125).

Figure 13:
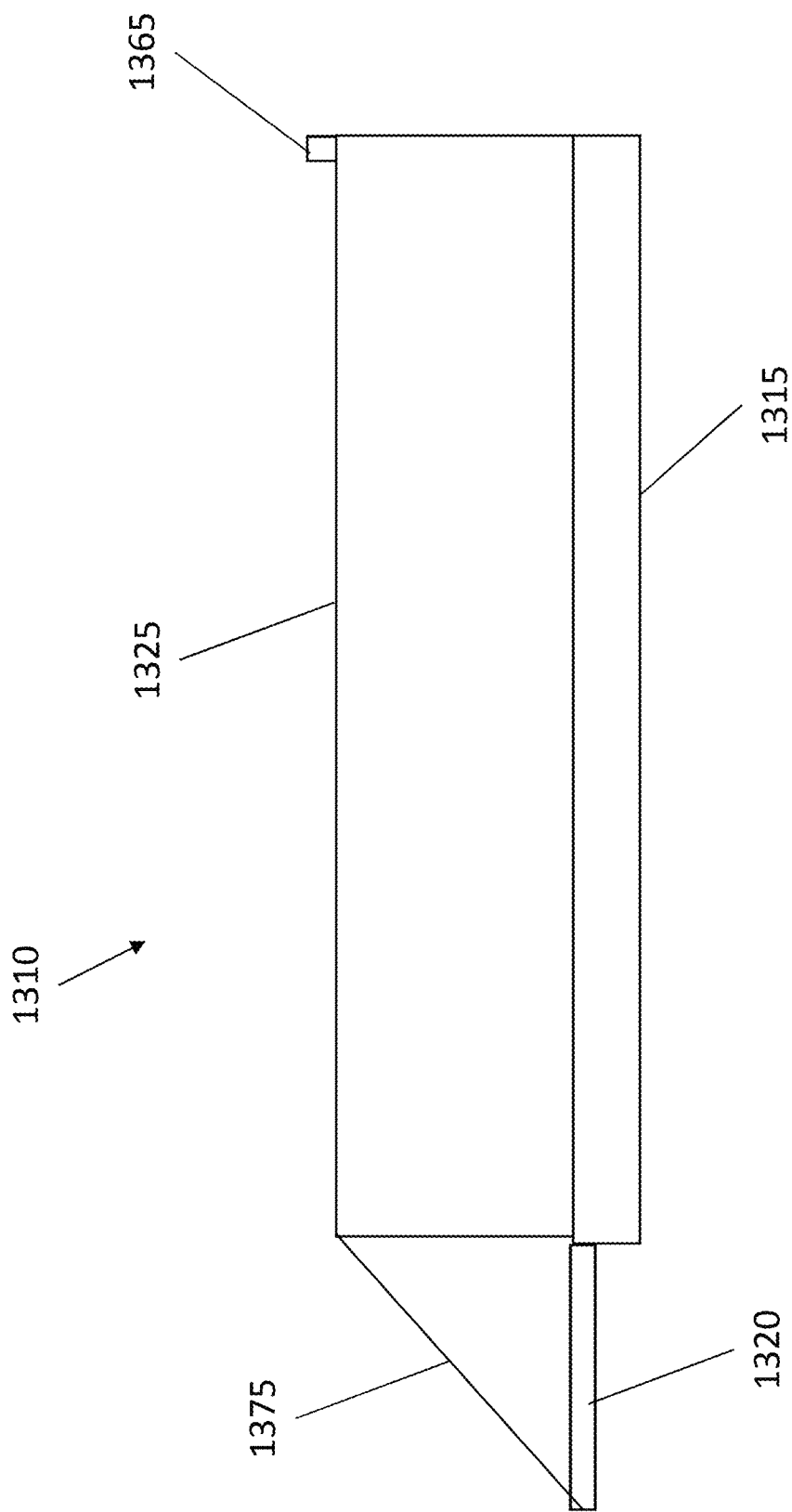
FIG. 13 shows a side schematic view of an exemplary cargo bed with a tailgate in an open position in accordance with aspects of the disclosure.

FIG. 13 shows a side schematic view of an exemplary cargo bed 1310 with a tailgate 1320 in an open position in accordance with aspects of the disclosure. In the open positon, the tailgate 1320 is approximately parallel to the cargo bed 1310. As shown in FIG. 13, the exemplary cargo bed 1310 includes a floor 1315, sidewalls 1325 (only one shown in FIG. 13), a front wall 1365, and the tailgate 1320. As shown in FIG. 13, the viewable sidewall 1325 is in the upright (or closed) position. The tailgate 1320 may be held in the open positon via support cables 1375 arranged between, for example, sides of the tailgate 1320 and respective vertical posts (not shown) arranged at rear corners of the floor 1315. Respective ends of the support cables may secured (e.g., fastened or hooked) to the tailgate 1320 and respective vertical posts (not shown). One or both ends of the cables may be releasably fastened or secured to the tailgate 1320 and respective vertical posts so that the tailgate 1320 may be released and rotated beyond the open position (e.g., to arrange the tailgate 1320 into a stored position under the floor 1315).

When utilizing a UTV, there may be situations in which the length of the cargo bed may need to be increased, for example, to accommodate a longer cargo item. In accordance with further aspects of the disclosure, the tailgate 1320 may be moved to the open positon and supported in the open positon via the cables 1375, so that an effective length of the cargo bed 1310 is increased by the length of the tailgate 1320. By implementing this aspect of the disclosure, the utilization of the cargo bed of the UTV may be increased.

Figure 14:
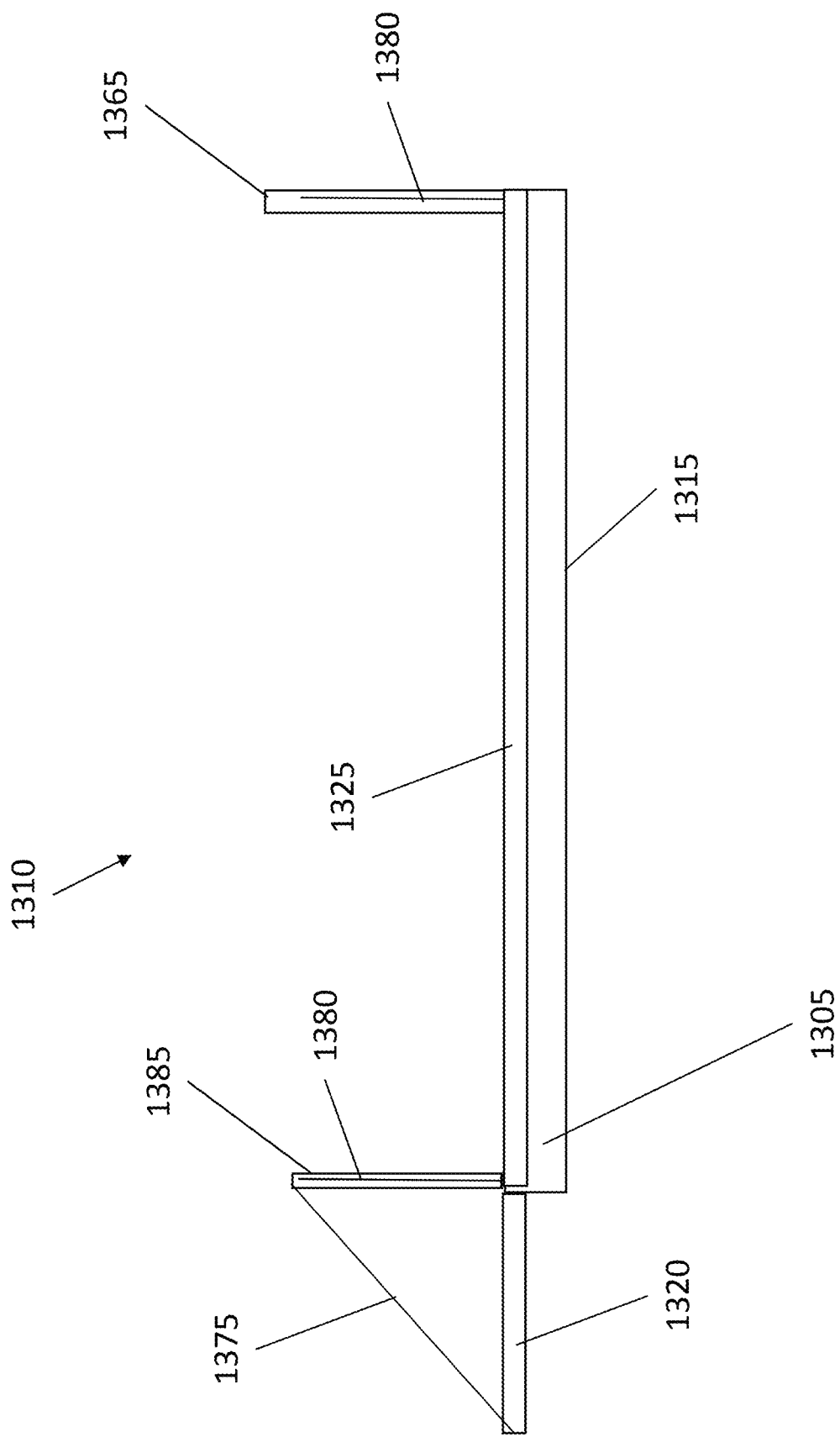
FIG. 14 shows a side schematic view of the exemplary cargo bed of FIG. 13 with the tailgate and the sidewalls in an open position in accordance with aspects of the disclosure.

FIG. 14 shows a side schematic view of the exemplary cargo bed of FIG. 13 with a tailgate 1320 and the sidewalls 1325 in an open position in accordance with aspects of the disclosure. In this open positon, the tailgate 1320 and the sidewalls 1325 are approximately parallel to the cargo bed 1310. In a similar manner to the tailgate 1320, the sidewall 1325 may be held in the open positon via a cable 1380 arranged between, for example, a side of the sidewall 1325 and a vertical post 1385 arranged at a rear corner of the floor 1315, and a cable arranged between another end side of the sidewall 1325 and the front wall 1365. The one or both ends of the cables may be releasably fastened or secured to the sidewall 1325 and the vertical post or the front wall 1365 so that the sidewall 1325 may be released and rotated beyond the open position (e.g., to arrange the sidewall 1325 into a stored position under the floor 1315). In some exemplary embodiments, the vertical posts 1385 may be selectively removable (e.g., from suitable receiving slots) and may be storable on the UTV when not being utilized.

When utilizing a UTV, there may be situations in which the length and width of the cargo bed may need to be increased, for example, to accommodate a longer and wider cargo item. That is, while the UTV generally has a relatively small profile, allowing the UTV to access and navigate through more confined areas, there may be situations in which the smaller profile is not necessary but a larger cargo bed is desired. In accordance with further aspects of the disclosure, the tailgate 1320 and the sidewalls 1325 may be moved to their respective open positons and supported in their respective open positon via the cables 1375 and 1380, so that an effective length of the cargo bed 1310 is increased by the height of the tailgate 1320 and an effective width of the cargo bed 1310 is increased by twice the height of the sidewalls 1325 (when both sidewalls are in an open position). Thus, by implementing this aspect of the disclosure, the utilization of the cargo bed of the UTV may be further increased.

Figure 15:
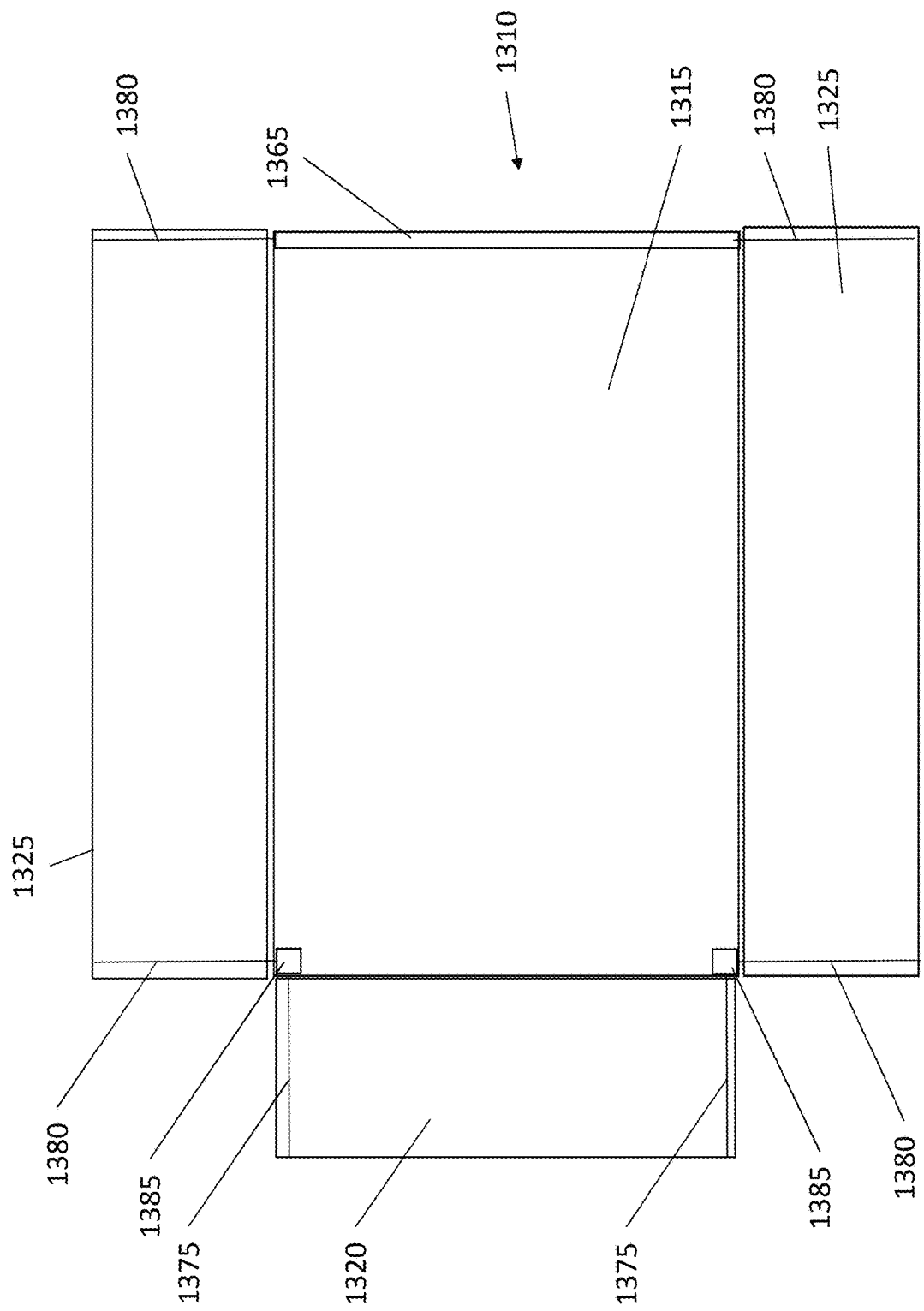
FIG. 15 shows a top schematic view of the exemplary cargo bed of FIG. 13 with the tailgate and the sidewalls in an open position in accordance with aspects of the disclosure.

FIG. 15 shows a top schematic view of the exemplary cargo bed 1310 of FIG. 13 with a tailgate 1320 and the sidewalls 1325 in an open position in accordance with aspects of the disclosure. As shown in FIG. 15, the tailgate 1320 may be held in the open positon via cables 1375 arranged between sides of the tailgate 1320 and respective vertical posts 1385 arranged at rear corners of the floor 1315. In a similar manner to the tailgate 1320, each of the sidewalls 1325 may be held in the open positon via a first cable 1380 arranged between the sidewall 1325 and a vertical post 1385 arranged at a rear corner of the floor 1315 and a second cable arranged between another end of the sidewall 1325 and the front wall 1365.

As shown in FIG. 15, with the tailgate 1320 and the sidewalls 1325 arranged in their respective open positons and supported in their respective open positon via the cables 1375 and 1380, an effective length of the cargo bed 1310 is increased by the height of the tailgate 1320 and an effective width of the cargo bed 1310 is increased by twice the height of the sidewalls 1325 (when both sidewalls are in an open position as shown in FIG. 15). It should be noted that while FIG. 15 shows the tailgate and the sidewalls in the open position, the disclosure contemplates that any of the tailgate and the two sidewalls may be arranged in the open position or the closed position, as necessary. Thus, by implementing this aspect of the disclosure, the utilization of the cargo bed of the UTV may be further increased.

Figure 16:
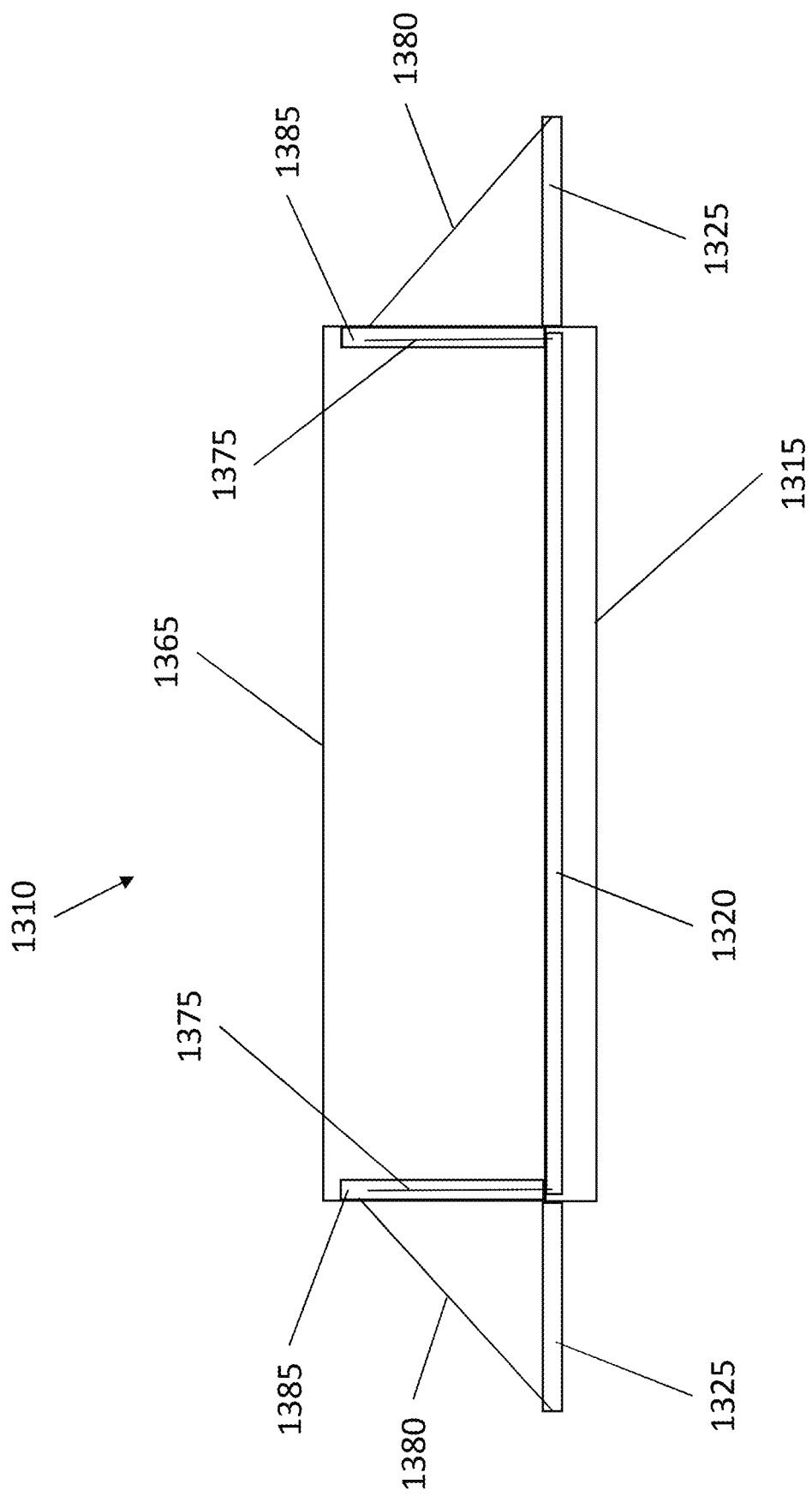
FIG. 16 shows a rear schematic view of the exemplary cargo bed of FIG. 13 with a tailgate and the sidewalls in an open position in accordance with aspects of the disclosure.

FIG. 16 shows a rear schematic view of the exemplary cargo bed of FIG. 13 with a tailgate and the sidewalls in an open position in accordance with aspects of the disclosure. As shown in FIG. 16, the tailgate 1320 may be held in the open positon via cables 1375 arranged between sides of the tailgate 1320 and respective vertical posts 1385 arranged at rear corners of the floor 1315. In a similar manner to the tailgate 1320, each of the sidewalls 1325 may be held in the open positon via a first cable 1380 arranged between the sidewall 1325 and a vertical post 1385 arranged at a rear corner of the floor 1315 and a second cable arranged between another end of the sidewall 1325 and the front wall 1365. As shown in FIG. 16, in this open positon, the tailgate 1320 and the sidewalls 1325 are approximately parallel to the cargo bed 1310.

FIG. 17 depicts an exemplary method for rearranging a sidewall (or tailgate) in accordance with aspects of the disclosure. At 1705, the tailgate is rotated from the open position to the stored position utilizing a hinge assembly. At 1710, a locking assembly is engaged to lock the tailgate in the stored position. At step 1715, the sidewalls are moved (e.g., concurrently or sequentially) from their respective upright positions to their respective stored positions utilizing a pivot and slide motion. At step 1720, respective locking assemblies are engaged to lock the sidewalls in their respective stored positions.

While the disclosure has been described with reference to specific embodiments, those skilled in the art will understand that various changes may be made and equivalents may be substituted for elements thereof without departing from the true spirit and scope of the disclosure. For example, while the storable tailgate and sidewalls are movable to their stored positions while remaining mechanically connected with the cargo bed, with other contemplated embodiments, the storable tailgate and/or the sidewalls may be movable to their stored positions by being detached from the cargo bed from their respective use positions, and subsequently secured (or re-attached) to the cargo bed in their respective storage positions. Additionally, with other contemplated embodiments, hydraulic and/or pneumatic cylinders (or springs) may be used to assist movement of the tailgate and/or sidewalls when being moved between positions (e.g., between stored position and use position or open position or vice versa). With yet additional contemplated embodiments, a four-bar mechanism may be used to move, for example, the respective sidewalls or tailgate between positions.

While exemplary embodiments are described above, it is not intended that these embodiments describe all possible forms of the embodiments of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

One or more embodiments of the disclosure may be referred to herein, individually and/or collectively, by the term "invention" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

What is claimed is:

1. A cargo bed for a utility terrain vehicle (UTV), the cargo bed comprising:
   a floor;
   a tailgate; and
   a pair of sidewalls,
   wherein the cargo bed is operable to convert from a walled configuration into a wall-stored configuration while the pair of sidewalls and the tailgate remain mechanically-connected to the floor.

2. The cargo bed of claim 1, wherein in the walled configuration, the sidewalls are in an upright position with respect to the floor, and
   wherein in the wall-stored configuration, the pair of sidewalls remain mechanically-connected to the floor and are positioned in respective sidewall storage positions underneath the floor.

3. The cargo bed of claim 2, wherein the pair of sidewalls are operable to at least one of pivot or slide into the respective sidewall storage positions underneath the floor.

4. The cargo bed of claim 1, wherein in the wall-stored configuration, the tailgate remains mechanically-connected to the floor and is positioned in a tailgate storage position underneath the floor.

5. The cargo bed of claim 4, wherein the tailgate is operable to one of pivot or slide into the tailgate storage position underneath the floor.

6. The cargo bed of claim 4, wherein the pair of sidewalls are one of removeably attachable to the floor and pivotably foldable with respect to the floor.

7. The cargo bed of claim 1, wherein the tailgate is mechanically-detachable from the floor.

8. The cargo bed of claim 1, wherein in the walled configuration, at least the sidewalls are in an upright position with respect to the floor, and
   wherein in the wall-stored configuration, the tailgate is positioned in a tailgate storage position underneath the floor and the pair of sidewalls are positioned in respective sidewall storage positions underneath the floor.

9. The cargo bed of claim 8, wherein the tailgate storage position is lower than the respective sidewall storage positions such that in the wall-stored configuration, the tailgate is beneath the respective sidewalls.

10. The cargo bed of claim 8, wherein the tailgate storage position is higher than the respective sidewall storage positions such that in the wall-stored configuration, the tailgate is above the respective sidewalls.

11. The cargo bed of claim 1, wherein the tailgate is:
    structured to pivot from a closed position, in which the tailgate is arranged approximately perpendicular with respect to the floor, to an open position, in which the tailgate is arranged approximately parallel with respect to the floor; and
    structured to pivot from the open position to a tailgate storage position, in which the tailgate is arranged approximately parallel with respect to the floor and positioned underneath the floor.

12. The cargo bed of claim 1, wherein each sidewall is:
    structured to pivot from a sidewall closed position, in which the sidewall is arranged approximately perpendicular with respect to the floor to an open position, in which the sidewall is arranged approximately parallel with respect to the floor; and
    structured to slide from the open position to a sidewall storage position, in which the sidewall is arranged approximately parallel with respect to the floor and positioned underneath the floor.

13. The cargo bed of claim 2, further comprising for each sidewall, a sidewall locking assembly operable to selectively lock each sidewall in the respective sidewall storage positions.

14. The cargo bed of claim 4, further comprising a tailgate locking assembly operable to selectively lock the tailgate in the tailgate storage position.

15. The cargo bed of claim 4, further comprising a hinge assembly connected between the floor and the tailgate, wherein the hinge assembly is operable to swing the tailgate from a closed position, in which the tailgate is arranged approximately perpendicular with respect to the floor, to the tailgate storage position, in which the tailgate is arranged approximately parallel with respect to the floor and positioned underneath the floor.

16. The cargo bed of claim 1, wherein the cargo bed further comprises for each sidewall a pivot/slide assembly connected between the floor and the sidewall, and wherein the pivot/slide assembly is operable to swing the sidewall from a sidewall closed position, in which the sidewall is arranged approximately perpendicular with respect to the floor, to an open position, in which the sidewall is arranged approximately parallel with respect to the floor, and further operable to slide the sidewall from the open position to a sidewall storage position, in which the sidewall is arranged approximately parallel with respect to the floor and positioned underneath the floor.

17. The cargo bed of claim 4, wherein when the tailgate is positioned in the tailgate storage position underneath the floor, an inner side of the tailgate is facing downwardly.

18. The cargo bed of claim 2, wherein when the pair of sidewalls are positioned in respective sidewall storage positions underneath the floor, respective inner sides of the sidewalls are facing upwardly.

19. The cargo bed of claim 1, wherein the cargo bed is further configured to convert from a walled configuration into an expanded flatbed configuration, in which at least one of the sidewalls is in an open position with the at least one sidewall approximately parallel to the floor.

20. The cargo bed of claim 19, further comprising:
a front wall arranged at a front of the floor;
a vertical post arranged at each of rear corners of the floor;
tailgate supports extending between sides of the tailgate and each of the vertical posts; and
for each sidewall, a first sidewall support extending between a rear side of the sidewall and one of the vertical posts and a second sidewall support extending between a front side of the sidewall and the front wall.

21. A cargo bed for a utility terrain vehicle (UTV), the cargo bed comprising:
a floor;
a tailgate;
a pair of sidewalls; and
a hinge assembly connected between the floor and the tailgate,
wherein the cargo bed is operable to convert from a walled configuration into a wall-stored configuration while at least one of the pair of sidewalls and the tailgate remains mechanically-connected to the floor,
wherein in the wall-stored configuration, the tailgate remains mechanically-connected to the floor and is positioned in a tailgate storage position underneath the floor,
wherein the hinge assembly is operable to swing the tailgate from a closed position, in which the tailgate is arranged approximately perpendicular with respect to the floor, to the tailgate storage position, in which the tailgate is arranged approximately parallel with respect to the floor and positioned underneath the floor, and
wherein the hinge assembly comprises a swing plate pivotably connected via a first pivotable connection to the floor and pivotably connected via a second pivotable connection to the tailgate.

22. The cargo bed of claim 21, wherein the cargo bed is operable to convert from the walled configuration into the wall-stored configuration while the tailgate and the pair of sidewalls remain mechanically-connected to the floor.

23. The cargo bed of claim 21, wherein the cargo bed further comprises an extending portion extending from a rear end of the floor, and
wherein, when the tailgate is in the closed position the extending portion is arranged between the swing plate and the tailgate, such that the swing plate is adjacent a lower surface of the extending portion and the tailgate is adjacent an upper surface of the extending portion.

24. A cargo bed for a utility terrain vehicle (UTV), the cargo bed comprising:
a floor;
a tailgate; and
a pair of sidewalls,
wherein the cargo bed is operable to convert from a walled configuration into a wall-stored configuration while at least one of the pair of sidewalls and the tailgate remains mechanically-connected to the floor,
wherein the cargo bed further comprises for each sidewall a pivot/slide assembly connected between the floor and the sidewall, and wherein the pivot/slide assembly is operable to swing the sidewall from a sidewall closed position, in which the sidewall is arranged approximately perpendicular with respect to the floor, to an open position, in which the sidewall is arranged approximately parallel with respect to the floor, and further operable to slide the sidewall from the open position to a sidewall storage position, in which the sidewall is arranged approximately parallel with respect to the floor and positioned underneath the floor,
wherein the pivot/slide assembly comprises at least one swing arm connected to the sidewall, and a respective pivot/slide bearing attached underneath the floor, wherein the at least one swing arm has an end operable to pivot and slide in the pivot/slide bearing, and
wherein each of the respective pivot/slide bearings are arranged at locations spaced inwardly from ends of the cargo bed in a longitudinal direction.

25. The cargo bed of claim 24, wherein each pivot/slide bearing includes a pivot portion arranged at a more outward side of the pivot/slide bearing, and a slide portion extending from the pivot portion to a terminal end of the pivot/slide bearing.

26. A cargo bed for a utility terrain vehicle (UTV), the cargo bed comprising:
a floor;
a tailgate; and
a pair of sidewalls,
wherein the cargo bed is operable to convert from a walled configuration into a wall-stored configuration while at least one of the pair of sidewalls and the tailgate remains mechanically-connected to the floor,
wherein in the walled configuration, the sidewalls are in an upright position with respect to the floor,
wherein in the wall-stored configuration, the pair of sidewalls remain mechanically-connected to the floor and are positioned in respective sidewall storage positions underneath the floor, and
wherein when in the wall-stored configuration, the tailgate in the tailgate storage position is structured and arranged to retain the sidewalls positioned in the respective sidewall storage positions, or the sidewalls positioned in the respective sidewall storage positions are structured and arranged to retain the tailgate in the tailgate storage position.

27. A method of converting a cargo bed having a floor, a tailgate, and a pair of sidewalls from a walled configuration into a wall-stored configuration while at least one of the tailgate and the pair of sidewalls remain mechanically-connected with the floor, the method comprising at least one of:

moving the tailgate from an open position to a tailgate storage position while the tailgate remains mechanically-connected with the floor; and moving each of the sidewalls from an upright position to a sidewall open position while the pair of sidewalls remain mechanically-connected with the floor, and further moving each of the sidewalls from the sidewall open position to respective sidewall storage positions while the pair of sidewalls remain mechanically-connected with the floor.

28. A cargo bed for a utility terrain vehicle (UTV), the cargo bed comprising:

a floor;

a tailgate; and a pair of sidewalls, wherein the cargo bed is operable to convert from a walled configuration into a wall-stored configuration while the pair of sidewalls and the tailgate remain mechanically-connected to the floor, and wherein the tailgate is operable to one of pivot or slide from a tailgate open position into the tailgate storage position underneath the floor while the tailgate remains mechanically-connected with the floor.

\* \* \* \* \*